US012219452B2

(12) United States Patent
Petit et al.

(10) Patent No.: US 12,219,452 B2
(45) Date of Patent: Feb. 4, 2025

(54) MANAGING TRANSMISSION OF MISBEHAVIOR REPORTS

(71) Applicant: QUALCOMM Incorporated, San Diego, CA (US)

(72) Inventors: Jonathan Petit, Wenham, MA (US); William Whyte, Natick, MA (US); Cong Chen, Shrewsbury, MA (US); Jean-Philippe Monteuuis, Shrewsbury, MA (US); Mohammad Raashid Ansari, Lowell, MA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/659,359

(22) Filed: Apr. 15, 2022

(65) Prior Publication Data

US 2023/0336956 A1 Oct. 19, 2023

(51) Int. Cl.
*H04W 4/12* (2009.01)
*H04W 4/40* (2018.01)
*H04W 4/90* (2018.01)
*H04W 28/06* (2009.01)

(52) U.S. Cl.
CPC ............... *H04W 4/90* (2018.02); *H04W 4/12* (2013.01); *H04W 4/40* (2018.02); *H04W 28/06* (2013.01)

(58) Field of Classification Search
CPC ....................................................... H04W 4/90
USPC ........................................................ 455/404.1
See application file for complete search history.

(56) References Cited

U.S. PATENT DOCUMENTS

2019/0229976 A1* 7/2019 Dhesikan ............ H04L 41/0681
2021/0337387 A1* 10/2021 Ueno .................. H04W 12/122

OTHER PUBLICATIONS

International Search Report and Written Opinion—PCT/US2023/013494—ISA/EPO—Jun. 1, 2023 12 pages.

* cited by examiner

*Primary Examiner* — Qutbuddin Ghulamali
(74) *Attorney, Agent, or Firm* — Muncy, Geissler, Olds & Lowe, P.C.

(57) ABSTRACT

Various embodiments include methods and systems for vehicle-to-everything (V2X) system of a vehicle for managing transmission of misbehavior reports. Various embodiments may include generating a misbehavior report based on a detected V2X misbehavior, assigning a priority or a transmission probability to the generated misbehavior report based on an external condition related to the detected V2X misbehavior, and transmitting the misbehavior report based on the assigned priority or transmission probability.

30 Claims, 13 Drawing Sheets

MANAGING TRANSMISSION OF MISBEHAVIOR REPORTS

BACKGROUND

Vehicle-to-Everything (V2X) systems may employ protocols and messaging defined under a relevant standard, such as Cellular Vehicle-to-Everything (C-V2X), Dedicated Short Range Communication (DSRC), and ITS-G5. These standards serve as the foundation for vehicle-based wireless communications, and may be used to support intelligent highways, autonomous and semi-autonomous vehicles, and improve the overall efficiency and safety of the highway transportation systems. An element of V2X systems is the ability for a vehicle to broadcast V2X messages that other vehicles can receive and process to improve traffic safety, such as Basic Safety Messages (BSM) or Cooperative Awareness Messages (CAM).

V2X systems may be configured to detect inaccurate or intentionally false information in a V2X message received from another vehicle or from Intelligent Transportation System (ITS) infrastructure devices, such as Roadside Units (RSUs). Further, V2X systems may be configured to send a report of detected inaccurate or intentionally false information to a Misbehavior Authority (MA) computing device. However, if numerous V2X systems each detect and send a report about such inaccurate or intentionally false information, an MA computing device may receive numerous redundant reports, potentially overloading the MA computing device. Further, the sending of redundant reports consumes finite communication network resources and processing capacity of the V2X systems and the MA computing device.

SUMMARY

Various aspects include methods that may be performed by a processor of a vehicle-to-everything (V2X) system for managing transmission of misbehavior reports. Various aspects may include generating a misbehavior report based on a detected V2X misbehavior, assigning a priority or a transmission probability to the generated misbehavior report based on an external condition related to the detected V2X misbehavior, and transmitting the misbehavior report based on the assigned priority or transmission probability.

In some aspects, assigning a priority or a transmission probability to the generated misbehavior report based on an external condition related to the detected V2X misbehavior may include determining for the misbehavior report an event type of the detected V2X misbehavior and determining a context of the detected V2X misbehavior based on an anticipated response to the detected V2X misbehavior, and assigning to the misbehavior report a criticality value based on the determined event type and the context of the detected V2X misbehavior. In such aspects, transmitting the misbehavior report based on the assigned priority may include transmitting the misbehavior report based on the assigned criticality value.

In some aspects, determining the context of the detected V2X misbehavior based on an anticipated response to the detected V2X misbehavior may include determining the context based on a degree to which the anticipated response by the vehicle to the detected V2X misbehavior will deviate from a current behavior of the vehicle. In some aspects, determining the context of the detected V2X misbehavior based on an anticipated response to the detected V2X misbehavior may include determining an anticipated response to the detected V2X misbehavior by one or more proximate vehicles. In some aspects, determining the context of the detected V2X misbehavior based on an anticipated response to the detected V2X misbehavior may include determining a degree to which the detected V2X misbehavior deviates from a ground truth determined by a processor of the V2X system.

In some aspects, transmitting the misbehavior report based on the assigned criticality value may include using the assigned criticality value as a weight factor together with other factors used in determining whether to transmit the misbehavior report. In some aspects, assigning a priority or a transmission probability to the generated misbehavior report based on an external condition related to the detected V2X misbehavior may include determining a number of V2X-enabled neighbor vehicles, determining a weighting factor based on the number of V2X-enabled neighbor vehicles, and using the weighting factor to adjust the transmission probability. In such aspects, transmitting the misbehavior report based on the assigned priority or transmission probability may include transmitting the misbehavior report based on the adjusted transmission probability.

Some aspects may include determining whether a number of neighbor vehicles proximate to the vehicle exceeds a threshold number of vehicles, determining distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles, determining a number of vehicles that are closest to the location associated with the detected V2X misbehavior, taking an action to increase the probability that the processor will send the misbehavior report in response to determining that the vehicle is among the number of vehicles that are closest to the location associated with the detected V2X misbehavior, and taking an action to decrease the probability that the processor will send the misbehavior report in response to determining that the vehicle is not among the number of vehicles that are closest to the location associated with the detected V2X misbehavior. In some aspects, assigning a priority or a transmission probability to the generated misbehavior report based on an external condition related to the detected V2X misbehavior may include receiving from a network computing device a misbehavior report policy including parameters usable by the processor to determine whether to send a misbehavior report, and assigning the priority or the transmission probability to the generated misbehavior report based on the parameters of the misbehavior report policy.

In some aspects, the misbehavior report policy parameters may include a time window, and assigning a priority or a transmission probability to the generated misbehavior report based on the parameters of the misbehavior report policy may include taking an action to increase the probability that the processor will send the misbehavior report in response to determining that the misbehavior report was generated during the time window. In some aspects, the misbehavior report policy parameters may include an indication to increase the probability of the processor sending the misbehavior report, and assigning a priority or a transmission probability to the generated misbehavior report based on the parameters of the misbehavior report policy may include taking an action to adjust the probability that the processor will send the misbehavior report in response to the indication in the misbehavior report policy parameters. In some aspects, the misbehavior report policy parameters may include a threshold number of misbehavior reports related to a same V2X sender, and assigning a priority or a transmission probability to the generated misbehavior report based on the parameters of the misbehavior report policy may include sending the misbehavior report in response to determining that a number of V2X reports generated by the processor that are related to the same V2X sender meets the threshold included in the misbehavior report policy parameters.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
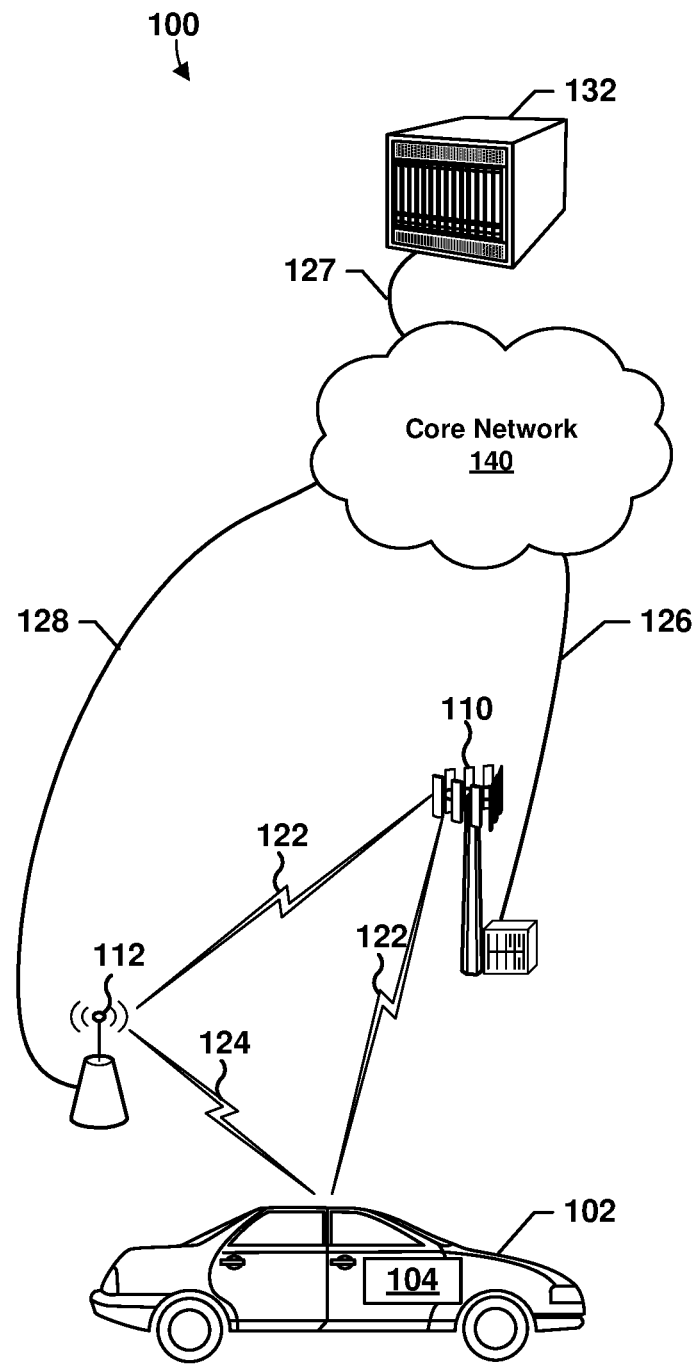
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and processors of a vehicle V2X system for managing transmission of misbehavior reports to reduce the transmission of low criticality and/or redundant misbehavior reports by several vehicles without actively coordinating such transmissions (e.g., without a transmission coordinator or controller). The transmission of redundant and low-criticality misbehavior reports could overwhelm the system bandwidth available for transmitting misbehavior reports, particularly in traffic conditions, which could result in some misbehavior reports never being transmitted. However, an active control system deployed across all or most vehicles would require additional bandwidth for the control signaling. In various embodiments, the V2X system may generate a misbehavior report based on a detected V2X misbehavior, dynamically assign a priority or criticality to the generated misbehavior report based on an external condition related to the detected V2X misbehavior, and transmit the misbehavior report based on the assigned priority or criticality in a manner that when deployed in many other vehicles may reduce the incidence of redundant misbehavior report transmissions. In some embodiments, the V2X system may assign to misbehavior reports a priority for transmission, such as based on a type or determined criticality value, and then transmit misbehavior reports from a queue in priority order, with misbehavior reports older than a threshold age being discarded before transmission. In some embodiments, the V2X system may assign to misbehavior reports a probability of transmission, such as based on a misbehavior type or determined criticality value, and then use the probability to determine whether the misbehavior report is transmitted during each transmission opportunity for misbehavior reports. In some embodiments, the assigned probability may be used in conjunction with a random or semi-random process (e.g., a random number generator, a random die, or other semi-random process) to make a transmission decision, such as comparing the probability to a random number or multiplying the assigned probability by a random value and comparing the product to a threshold. When such embodiments are implemented among most or all vehicles, the resulting transmission rate of reports of a given misbehavior that is detected by many or all nearby vehicles may be limited without additional overhead communications or a central controller.

As used herein, the term "vehicle" refers generally to any of an automobile, motorcycle, truck, bus, train, boat, and any other type of vehicle V2X-capable system that may be configured to manage transmission of misbehavior reports.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Technologies and technical standards are under development in multiple regions of the world for supporting evolving and future highway systems and vehicles, including setting standards for enabling safe autonomous and semi-autonomous vehicle operations. Such technologies include standardizing vehicle-based communication systems and functionality, and developing standards for vehicle Autonomous Driving Systems (ADS), Advanced Driver Assistance Systems (ADAS), and the like, referred to generally herein as "V2X systems."

Among technologies and standards that will support autonomous and semi-autonomous driving are communication technologies and networks for Intelligent Highway Systems (ITS). Examples include standards being developed by the Institute of Electrical and Electronics Engineers (IEEE) and Society of Automotive Engineers (SAE) for use in North America, or in the European Telecommunications Standards Institute (ETSI) and European Committee for Standardization (CEN) for use in Europe. For example, the IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. ITS communications may be supported by next-generation 5G NR communication systems. These and other V2X wireless technologies may be used in various embodiments for downloading map data.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc.

V2X systems may be configured to detect inaccurate or intentionally false information in a V2X message received from another vehicle or from Intelligent Transportation System (ITS) infrastructure devices, such as Roadside Units (RSUs). Such inaccurate or intentionally false information in a V2X message may be referred to as "V2X misbehavior." V2X systems may be configured to generate and send a report of such detected inaccurate or intentionally false information, such as misbehavior report, to a Misbehavior Authority network computing device, such as a server. (Misbehavior Authority servers and other network computing devices are referred to herein for conciseness as an "MA"). However, V2X systems operate are constrained by finite communication resources (such as signal bandwidth, transmission opportunities, receive opportunities, etc.) and computational resources (such as compute resources, data storage capacity, and the like). Further, if numerous V2X systems each detect and send a report about such inaccurate or intentionally false information, an MA may receive numerous redundant reports, unnecessarily consuming MA resources as well as communication resources. Some conventional V2X systems are configured to statically assign a priority to misbehavior reports, for example, by assigning a certain priority to all misbehavior reports of a particular type of V2X misbehavior. This results in all misbehavior reports of a certain V2X misbehavior type being prioritized equally. Further, each conventional V2X system will send the misbehavior report to an MA regardless of whether other V2X systems are also sending identical misbehavior reports. In such cases, a V2X misbehavior will be reported to the MA roughly in proportion to the number of V2X systems that observe the V2X misbehavior, creating the risks that more-observed V2X misbehaviors are reported more than may be necessary, and that less-observed V2X misbehaviors may be crowded out or not reported at all, regardless of how dangerous or disruptive the less-observed V2X behavior may be.

Various embodiments overcome such limitations by managing transmission of misbehavior reports by dynamically generating a priority for a misbehavior report based on a condition external to the vehicle (i.e., the vehicle equipped with a V2X system that observes a V2X misbehavior). In some embodiments, a V2X system may be configured to generate a misbehavior report based on a detected V2X misbehavior, assign a priority to the generated misbehavior report based on an external condition related to the detected V2X misbehavior, and transmit the misbehavior report based on the assigned priority. For example, the V2X system may transmit misbehavior reports (i.e., misbehavior reports that have been generated, prioritized and stored in a transmission buffer) in the order of the assigned priority, with the highest priority misbehavior report stored in the buffered transmitted at each transmission opportunity. As misbehavior reports may be generated and prioritized and stored in the buffer frequently, while V2X transmission windows may be limited (e.g., in heavy traffic conditions), only those misbehavior reports assigned a high priority may be transmitted, and the probability that a low-priority misbehavior report transmits before the report is too old to transmit may be low. In this manner, a V2X system may use priority values assigned to misbehavior report to increase the probability that critical misbehavior reports will be transmitted to the MA while operating in limited bandwidth or crowded V2X traffic conditions, while less critical or low priority misbehavior reports may or may not be transmitted, depending on V2X communication conditions. In some embodiments, the V2X system also may assign a time stamp, an age value, a time-to-live value, or another suitable value to a misbehavior report, and may decrease the priority of the misbehavior report as it ages. In some embodiments, the V2X system may discard misbehavior reports that meet a threshold age. As a result, when transmission opportunities for misbehavior reports are limited, low priority misbehavior reports may never be transmitted as such reports may be discarded before there is a transmission opportunity not allocated to a higher priority misbehavior report.

In some embodiments, the V2X system may determine for the misbehavior report an event type of the detected V2X misbehavior, and may determine a context of the detected V2X misbehavior based on an anticipated response to the detected V2X misbehavior. The V2X system may assign to the misbehavior report a criticality value based on the determined event type and the context of the detected V2X misbehavior, and may transmit the misbehavior report based on the assigned criticality value to the MA. For example, the V2X system may transmit misbehavior reports stored in a transmission buffer with the highest criticality value are transmitted at each transmission opportunity. As another example, the V2X system may transmit misbehavior reports stored in a transmission buffer that have a criticality value that meets a transmission threshold. As another example, the V2X system may assign a probability of transmission to the misbehavior report based on the criticality value, with the probability used in conjunction with a random or semi-random process for determining whether to transmit the misbehavior report at any given transmission opportunity as described herein.

In some embodiments, the context of the detected V2X misbehavior may be based on an anticipated response to the detected V2X misbehavior that includes a likely or anticipated level of perturbation on the vehicle's behavior, or on traffic surrounding the vehicle. In some embodiments, the anticipated response may include an action that the processor may take, or may instruct the vehicle to take, in response to the detected V2X misbehavior. In this manner, the processor may determine dynamically based on one or more conditions external to the vehicle a severity of the V2X misbehavior. For example, a V2X message with the V2X misbehavior may include incorrect positioning information about the sending vehicle, such as an indication that the sending vehicle is within the vehicle's minimum safety distance or threshold distance. As another example, the V2X misbehavior may indicate incorrect kinematic information about the sending vehicle (e.g., related to the sending vehicle's speed, motion, maneuvers, etc.) that is indicated as occurring within the vehicle's minimum safety distance or threshold distance.

In some embodiments, the vehicle's V2X system may determine an anticipated response of the vehicle in response to the information in the V2X message. For example, the anticipated response of the vehicle may include braking the vehicle gently. As another example, the anticipated response of the vehicle may include a heavy application of the vehicle brakes, such as emergency braking or panic braking. As another example, the anticipated response of the vehicle may include changing lanes gradually. As another example, the anticipated response of the vehicle may include swerving away (i.e., maneuvering quickly) from the condition indicated by the V2X misbehavior.

In some embodiments, the V2X system may determine an anticipated response to the detected V2X misbehavior by one or more proximate vehicles, such as traffic around the vehicle (e.g., other vehicle(s) within a threshold distance from the vehicle, or within a threshold distance from a location associated with the V2X misbehavior).

In some embodiments, the V2X system may assign a criticality value to the misbehavior report based on the determined event type and the context of the detected V2X misbehavior. For example, the V2X system may determine that the V2X misbehavior includes incorrect positioning information that is within the vehicle's minimum safety distance, and the V2X system may assign a criticality value of "1" to the related misbehavior report. As another or example, the V2X system may determine that the V2X misbehavior includes incorrect positioning information that is outside the vehicle's minimum safety distance, and the V2X system may assign a criticality value of "2" to the related misbehavior report. As another example, the V2X system may determine that the V2X misbehavior includes incorrect kinematic information that is within the vehicle's minimum safety distance, and the V2X system may assign a criticality value of "1" to the related misbehavior report. As another example, the V2X system may determine that the V2X misbehavior includes incorrect kinematic information that is outside the vehicle's minimum safety distance, and the V2X system may assign a criticality value of "2" to the related misbehavior report. As another example, the V2X system may determine that the V2X misbehavior includes incorrect dimension information about the sending vehicle, or incorrect Intelligent Traffic System Station (ITS-S) type information, and the V2X system may assign a criticality value of "3" to the related misbehavior report. Other examples are also possible. In such embodiments, the V2X system may transmit misbehavior reports to the MA based on the assigned criticality value, such as sending misbehavior reports with a criticality value of "1" first, sending misbehavior reports with a criticality value of "2" second, and so forth. In some embodiments, the V2X system may assign a probability of transmission to the misbehavior report based on the assigned criticality value, with the probability used in conjunction with a random or semi-random process for determining whether to transmit the misbehavior report at any given transmission opportunity as described herein. For example, the V2X system may determine whether the probability of transmitting the misbehavior report meets a transmission criteria based on the generated random value, such as whether the probability is greater than or equal to the generated random value. As another example, the V2X system may multiply the probability times the random value and compare the product to a threshold. In response to determining that the product of multiplying the probability of transmitting the misbehavior report by the generated random value exceeds the threshold, the V2X system may transmit the misbehavior report.

In some embodiments, the V2X system may determine the context based on a degree to which the anticipated response by the vehicle to the detected V2X misbehavior will deviate from a current behavior of the vehicle, In and assign the criticality value based at least in part on the degree to which the anticipated response by the vehicle to the detected V2X misbehavior would deviate from a current behavior of the vehicle. For example, the greater the deviation from the current speed and path of the vehicle that the vehicle would have to initiate if the content of the received V2X was not determined to be invalid (i.e., there is no misbehavior), the greater the criticality value that would be ascribed to the misbehavior report. In some embodiments, the V2X system may determine the context based on an anticipated level of perturbation to the vehicle's behavior and/or the behavior on nearby traffic that the detected V2X misbehavior may cause. For example, as noted above, the anticipated response of the vehicle or surrounding vehicles may include braking the vehicle gently, or the anticipated response may include emergency braking or panic braking. As another example, the anticipated response of the vehicle or surrounding vehicles may include changing lanes gradually, or the anticipated response may include swerving away from the condition indicated by the V2X misbehavior.

In some embodiments, the V2X system may determine the context of the detected V2X misbehavior based on a determined degree to which the detected V2X misbehavior deviates from a ground truth determined by the processor of the V2X system. In some embodiments, the V2X system may receive information from various sensors of the vehicle about the V2X sender, and using such information the V2X system may determine a speed, position, movements, maneuvers, etc. of the V2X sender. In some embodiments, the V2X system may receive information about the V2X sender from another vehicle or vehicles, such as a trusted third vehicle, or from ITS infrastructure devices such as a road side unit. In some embodiments, the V2X system may use its own sensor information and information received from other vehicles or ITS infrastructure devices in any combination. In some embodiments, based on the degree to which the detected V2X misbehavior deviates from a ground truth determined by the processor of the V2X system, the V2X system may assign a greater criticality value (for wide deviations) or a lesser criticality value (for smaller deviations) to the misbehavior report.

In some embodiments, the V2X system may use the assigned criticality value as a weight factor or transmission probability used in determining whether to transmit the misbehavior report. For example, the V2X system may determine a probability that the V2X system will or should transmit the misbehavior report. In some embodiments, the V2X system may increase the probability that the V2X system will transmit the misbehavior report when an assigned criticality value indicates that the V2X misbehavior may have an immediate or proximate effect on the safety of the vehicle (e.g., the V2X misbehavior includes incorrect positioning information that is within the vehicle's minimum safety distance). As another example, the V2X system may decrease, or increase by a smaller factor, the probability that the V2X system will transmit the misbehavior report when an assigned criticality value that indicates that the V2X misbehavior is farther in time or space from the vehicle that does not pose an immediate or proximate threat to the safety of the vehicle. For example, in a situation in which a criticality value is based on a V2X message incorrectly indicating that a second vehicle is braking, but the second vehicle's position is outside the vehicle's safety distance for responding to such misbehavior, the V2X system may decrease, or increase by a smaller factor, the transmission probability for an associated the misbehavior report. In some embodiments, the V2X system may determine the probability of transmitting the misbehavior report based on the assigned criticality value and one or more other factors, and may transmit the misbehavior report based on the determined probability of transmission.

In some embodiments, the determined transmission probability (or criticality value or other similar value) assigned to a given misbehavior report may be used in conjunction with a random or semi-random process to determine whether to transmit the misbehavior report at a given misbehavior report transmission opportunity. When most or all vehicles in a particular location use the same process of assigning transmission probability and the same random or semi-random process to decide whether to transmit a misbehavior report, the transmission of redundant misbehavior reports by a number of vehicles may be limited without actively coordinating such transmissions (e.g., without a transmission coordinator or controller). In some embodiments, the V2X system may generate a random value (e.g., via a random number generator, digital dice, or other random process), and use the generated random value in conjunction with the probability to determine whether to transmit the misbehavior report. For example, the V2X system may determine whether the probability of transmitting the misbehavior report meets a transmission criteria based on the generated random value, such as whether the probability is greater than or equal to the generated random value. As another example, the V2X system may multiply the probability by the random value and compare the product to a threshold. In response to determining that the product of multiplying the probability of transmitting the misbehavior report by the generated random value exceeds the threshold, the V2X system may transmit the misbehavior report. In some embodiments, this operation may be performed at each misbehavior transmission opportunity and applied to all misbehavior reports in a queue for transmission to identify one of the queued misbehavior reports that will be transmitted.

In some embodiments, the V2X system may adjust a probability that the vehicle will transmit the generated misbehavior report based on an external condition such as whether other nearby vehicles are likely to also transmit a misbehavior report about the detected V2X misbehavior. In some embodiments, the V2X system may determine a number of neighbor vehicles (e.g., a number of vehicles within a threshold distance of the vehicle, or a number of vehicles within a threshold distance of the detected V2X misbehavior) that are capable of generating and transmitting V2X misbehavior reports ("V2X-enabled neighbor vehicles"). In such embodiments, the V2X system may determine a weighting factor based on the number of V2X-enabled neighbor vehicles, and may use the weighting factor to adjust a transmission probability assigned to the misbehavior report. For example, the V2X system may detect or identify a number n of V2X-enabled vehicles. The V2X system may determine a weighting factor based on the number n of V2X-enabled vehicles. In some embodiments, the weighting factor may be represented as $$f(n) = e^{-\frac{n}{c}},$$

where j(n) represents the weighting factor, n represents the number of proximate V2X-enabled vehicles, c represents a constant (e.g., 10) that scales the weighting factor with the number of reporting vehicles n, and e represents a constant (e.g., Euler's number). In some embodiments, the V2X system may take an action (e.g., perform a mathematical operation such as multiplication) using the weighting factor to adjust a probability that the processor will transmit the misbehavior report. In this manner, the V2X system may adjust the probability that the processor will transmit the misbehavior report based on the number of V2X-enabled neighbor vehicles. When this is implemented in all surrounding vehicles, this embodiment may have the effect on average of reducing the overall number of misbehavior reports regarding or triggered by the same V2X misbehavior that are transmitted to the MA the surrounding vehicles.

In some embodiments, the V2X system may transmit the misbehavior report based on the adjusted probability that the V2X system will report the detected V2X misbehavior (i.e., the probability that the V2X system will transmit the misbehavior report). In some embodiments, if the V2X system determines that other nearby vehicles are likely to transmit a misbehavior report on the same condition, the V2X system may assign a low priority to a misbehavior report generated in response to the same condition, thus reducing the probability that the V2X system will transmit a redundant misbehavior report. In some embodiments, the V2X system may assign a low transmission probability to the misbehavior report generated in response to the detected condition or event, and use a random process to decide whether the misbehavior report is transmitted at a given transmission opportunity. For example, the V2X system may determine whether the probability of transmitting the misbehavior report meets a transmission criteria based on the generated random value, such as whether the probability is greater than or equal to the generated random value, and transmit the misbehavior report in response to determining that the transmission criteria is satisfied. As another example, the V2X system may multiply the probability by the random value and compare the product to a threshold, and transmit the misbehavior report in response to determining that the product of multiplying the probability of transmitting the misbehavior report by the generated random value exceeds the threshold.

In some embodiments, the V2X system may determine whether to send the misbehavior report based on whether the vehicle is among a group of vehicles closest to the V2X sender. In some embodiments, the V2X system may determine whether a number of neighbor vehicles within a threshold distance to the vehicle exceeds a threshold number of vehicles. In some embodiments, the threshold number of vehicles may represent a maximum number of repetitive or redundant misbehavior reports that should be sent to the MA. In this manner, the V2X system may determine whether there are a threshold number of other vehicles present that may also send a misbehavior report about the V2X misbehavior. In response to determining that the number of neighbor vehicles proximate to the vehicle exceeds the threshold number of vehicles, the V2X system may determine distances between a location associated with the detected V2X misbehavior (e.g., the purported location of the V2X sender) and locations of each of the neighbor vehicles. The V2X system also may determine a distance between the location associated with the detected V2X misbehavior and the vehicle.

The V2X system may determine a number of vehicles that are closest to the location associated with the detected V2X misbehavior, such as within a threshold distance. In some embodiments, the number of vehicles may be a predetermined value (e.g., 10 vehicles). In some embodiments, the V2X system may use the threshold number of vehicles (i.e., from the determination of whether the number of neighbor vehicles proximate to the vehicle exceeds a threshold number of vehicles) in assigning a priority to a generated misbehavior report. The V2X system may determine whether the vehicle is among the number of vehicles that are closest to the location associated with the detected V2X misbehavior. In response to determining that the vehicle is among the number of vehicles that are closest to the location associated with the detected V2X misbehavior, the V2X system may take an action to increase the probability that the V2X system will send the misbehavior report. For example, if the V2X system may assign a high priority to an associated misbehavior report, thus increasing the probability that the V2X system will transmit the misbehavior report. In response to determining that the vehicle is not among the number of vehicles that are closest to the location associated with the detected V2X misbehavior, the V2X system may take an action to decrease the probability that the V2X system will send the misbehavior report. For example, if the V2X system may assign a low priority to an associated misbehavior report, thus reducing the probability that the V2X system will transmit a redundant misbehavior report. The V2X system may transmit its own misbehavior report based on the adjusted (increased or decreased) probability.

In some embodiments, the V2X system may generate a random value, and use the generated random value and the probability that the V2X system to decide whether to transmit the misbehavior report in a given transmission opportunity. For example, in response to determining that the probability of transmitting the misbehavior report meets a transmission criterion based on the generated random value (for example, whether the probability is greater than or equal to the generated random value), the V2X system may transmit the misbehavior report. As another example, in response to determining that the product of the probability of transmitting the misbehavior report multiplied by the generated random value satisfies a threshold (for example, is greater than or equal to the generated random value), the V2X system may transmit the misbehavior report.

In some embodiments, the V2X system may receive a misbehavior report policy from a network computing device (e.g., the MA) and may apply one or more parameters from the misbehavior report policy to determine whether to transmit a misbehavior report. In some embodiments, the V2X system may assign a priority to a generated misbehavior report based on the external condition of the parameters from the misbehavior report policy. In some embodiments, the misbehavior report policy parameters may include a time window, and the V2X system may take an action to increase the priority of, or to increase the probability that the processor will send, the misbehavior report in response to determining that the misbehavior report was generated during the time window.

In some embodiments, the misbehavior report policy may indicate a request from the MA to receive reports of a particular V2X misbehavior, or of a particular type of V2X misbehavior, regardless of whether the MA receives multiple redundant misbehavior reports. In some embodiments, the misbehavior report policy parameters may include an indication to increase the priority of the misbehavior report, or to increase the probability of the processor sending the misbehavior report, and the V2X system may take an action to increase the priority of the misbehavior report or increase the probability that the processor will send the misbehavior report in response to the indication in the misbehavior report policy parameters.

In some embodiments, the misbehavior report policy parameters may include a threshold number of misbehavior reports related to a same V2X sender, and the V2X system may send the misbehavior report in response to determining that a number of V2X reports generated by the processor that are related to the same V2X sender meets the threshold included in the misbehavior report policy parameters. For example, the misbehavior report policy may indicate a request from the MA to receive reports of V2X misbehavior by the same vehicle (the same V2X sender), which may indicate multiple occurrences of V2X misbehavior from the same V2X sender (which may identify the V2X sender as a malicious actor).

In various embodiments, the misbehavior report policy may include a variety of parameters, including types of V2X misbehavior of particular interest to the MA. In some embodiments, the MA may transmit the misbehavior report policy to the V2X system (e.g., the MA may "push" the misbehavior report policy). In some embodiments, the MA may transmit the misbehavior report policy to the V2X system in response to a request from the V2X system (e.g., the V2X system may "pull" the misbehavior report policy from the MA).

Various embodiments may improve the operation of V2X systems by enabling V2X systems to dynamically determine a priority for a misbehavior report based on an external condition related to the detected V2X misbehavior. Various embodiments may increase the efficiency or operation of V2X systems and the V2X network by reducing redundant reporting of V2X misbehavior, and by dynamically prioritizing reports of more critical V2X misbehavior, thereby more efficiently using finite computing capabilities and computing resources.

FIG. 1A is a system block diagram illustrating an example communication system 100 suitable for implementing the various embodiments. The communications system 100 include a 5G New Radio (NR) network, an ITS V2X wireless network, and/or any other suitable network such as a Long Term Evolution (LTE) network. References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a V2X system 104 that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., a V2X system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refers to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with V2X system-equipped vehicles 102 for downloading information useful for V2X system autonomous and semi-autonomous driving functions, and for receiving information such as misbehavior reports from the V2X system 104.

A Misbehavior Authority network computing device (MA) 132 may communicate with the core network 140 via a wired or wireless communication link 127. The MA 132 may receive misbehavior reports from the V2X system 104 as may be sent by the V2X system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Figure 1B:
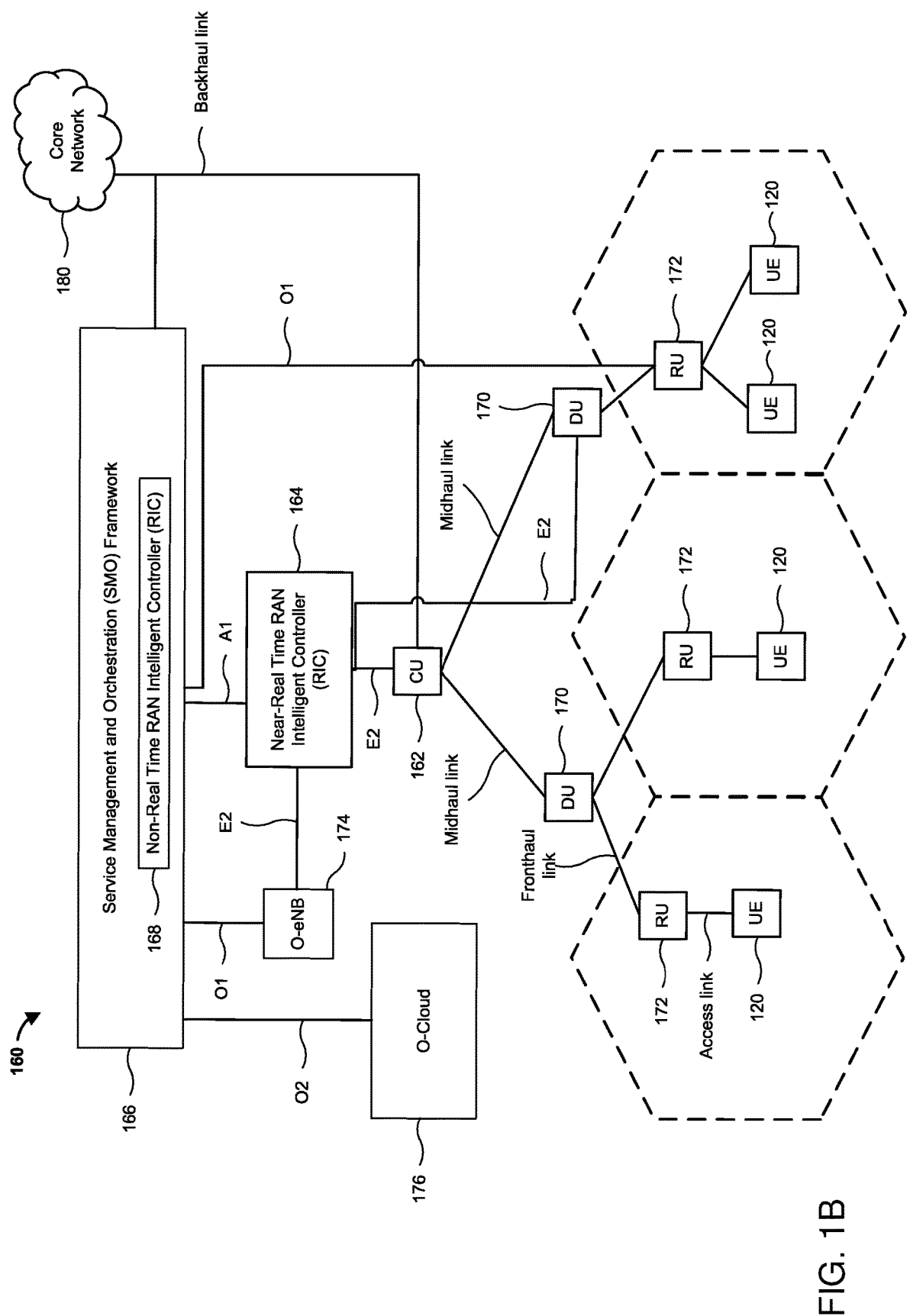
FIG. 1B is a system block diagram illustrating an example disaggregated base station architecture suitable for implementing any of the various embodiments.

FIG. 1B is a system block diagram illustrating an example disaggregated base station 160 architecture that may be part of a V2X and/or 5G network suitable for communicating map data to vehicles and communicating updated object/feature location data according to any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, user equipment (UE), such as a V2X system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 1C:
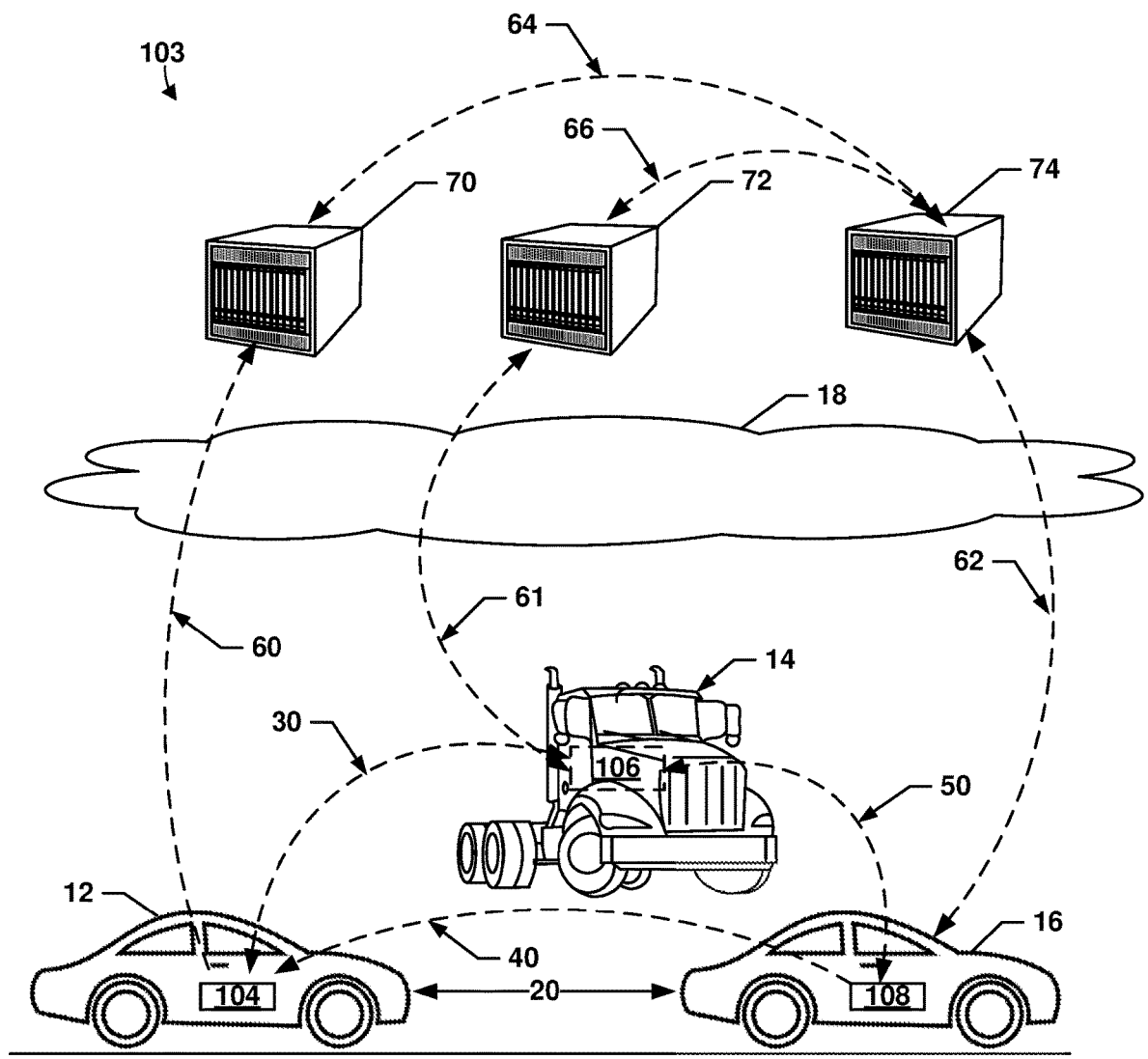
FIG. 1C is a system block diagram illustrating a communication system suitable for implementing various embodiments.

FIG. 1C is a system block diagram illustrating a communication system 103 suitable for implementing various embodiments. With reference to FIGS. 1A-1C, the communication system 103 may include three vehicles 12, 14, 16. Each vehicle 12, 14, 16 may include a V2X system 104, 106, 108, respectively, each configured to periodically broadcast V2X messages such as Basic Safety Messages 30, 40, 50 for receipt and processing by other vehicles' V2X systems (e.g., 104, 106, 108). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 30, 50 from the two vehicles 12, 16, and thus be informed that the truck vehicle 14 should stop at the intersection to avoid a collision. Each of the vehicle V2X on-board equipment 104, 106, 108 may communicate with one another using any of a variety close proximity communication protocols. In addition, the vehicles may be able to transmit data and information regarding detected Basic Safety Messages as well as a misbehavior report about detected V2X misbehavior to an original equipment manufacturer (OEM) (70, 72) and/or MA 74 (e.g., 132) via communication links 60, 61, 62 through a communication network 18. The misbehavior report may be transmitted directly to the MA 74 (e.g., via communication link 64, 66). In other embodiments, the misbehavior report may first be transmitted to a misbehavior report pre-processing unit such as the OEM servers 70, 72 for pre-processing through communication links 64, 66. Then the pre-processed misbehavior report may be transmitted from the misbehavior report pre-processing servers 70, 72 to the MA 74 through communication links 64, 66. In other embodiments, a misbehavior report may be received from a vehicle, such as from vehicle 16, at the MA 74. The MA 74 may relay the received misbehavior report from the vehicle 16 onto OEM servers 70, 72 via communication links 64, 66. In addition, the OEM servers 70, 72 may provide confirmation reports to the MA 74 via communication links 64, 66.

Figure 2A:
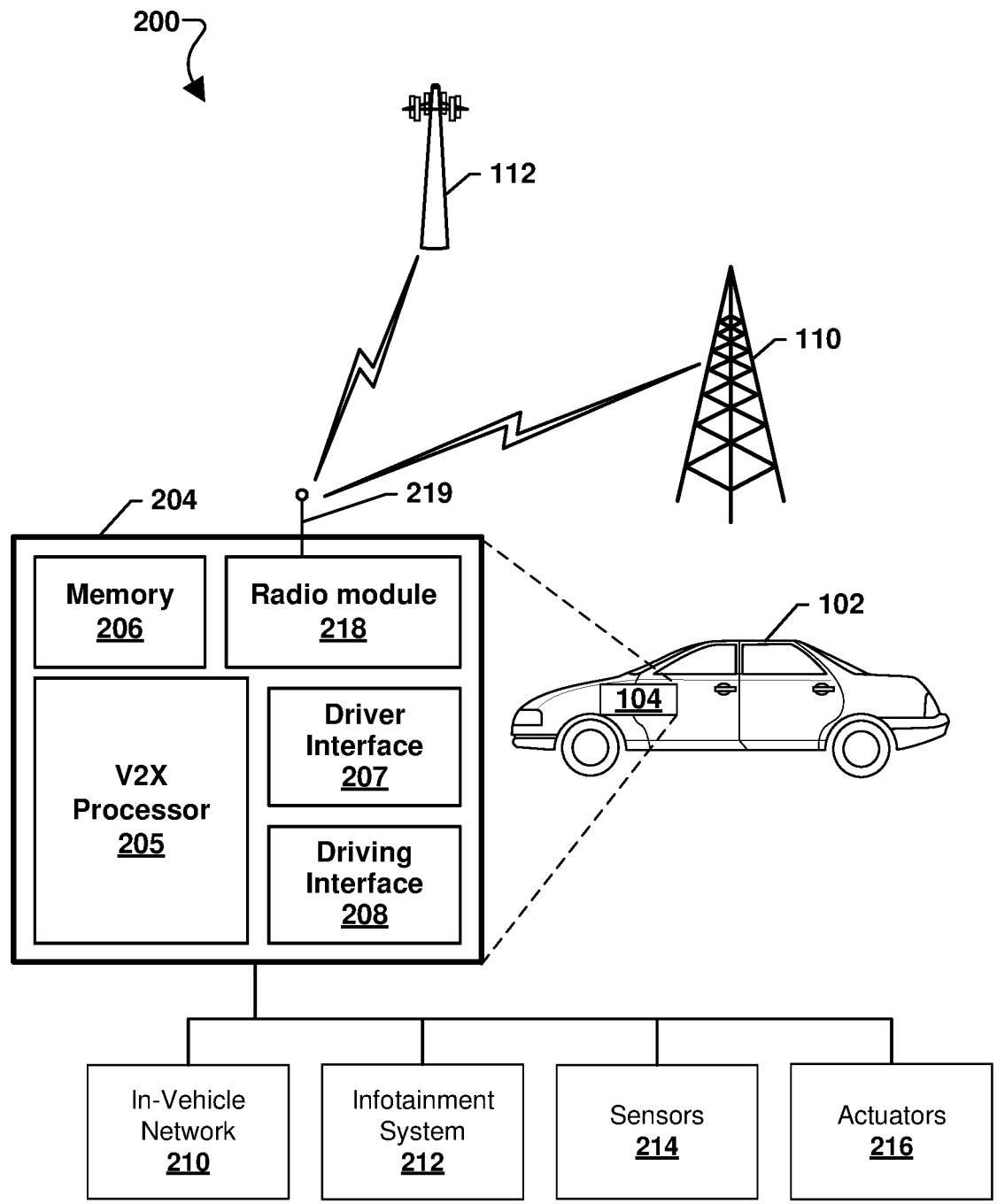
FIG. 2A is a component diagram of an example vehicle V2X system suitable for implementing various embodiments.

FIG. 2A is a component diagram of an example vehicle V2X system 200 suitable for implementing various embodiments. With reference to FIGS. 1A-2A, the system 200 may include a vehicle 102 that includes a V2X system 104. The vehicle processing system 104 may communicate with various systems and devices, such as an in-vehicle network 210, an infotainment system 212, various sensors 214, various actuators 216, and a radio module 218 coupled to an antenna 219. The vehicle processing system 104 also may communicate with roadside units 112, cellular communication network base stations 110, and other external devices.

The V2X system 204 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The V2X system 204 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the V2X system may receive information from a plurality of information sources, such as the in-vehicle network 210, infotainment system 212, various sensors 214, various actuators 216, and the radio module 218. The V2X system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2B:
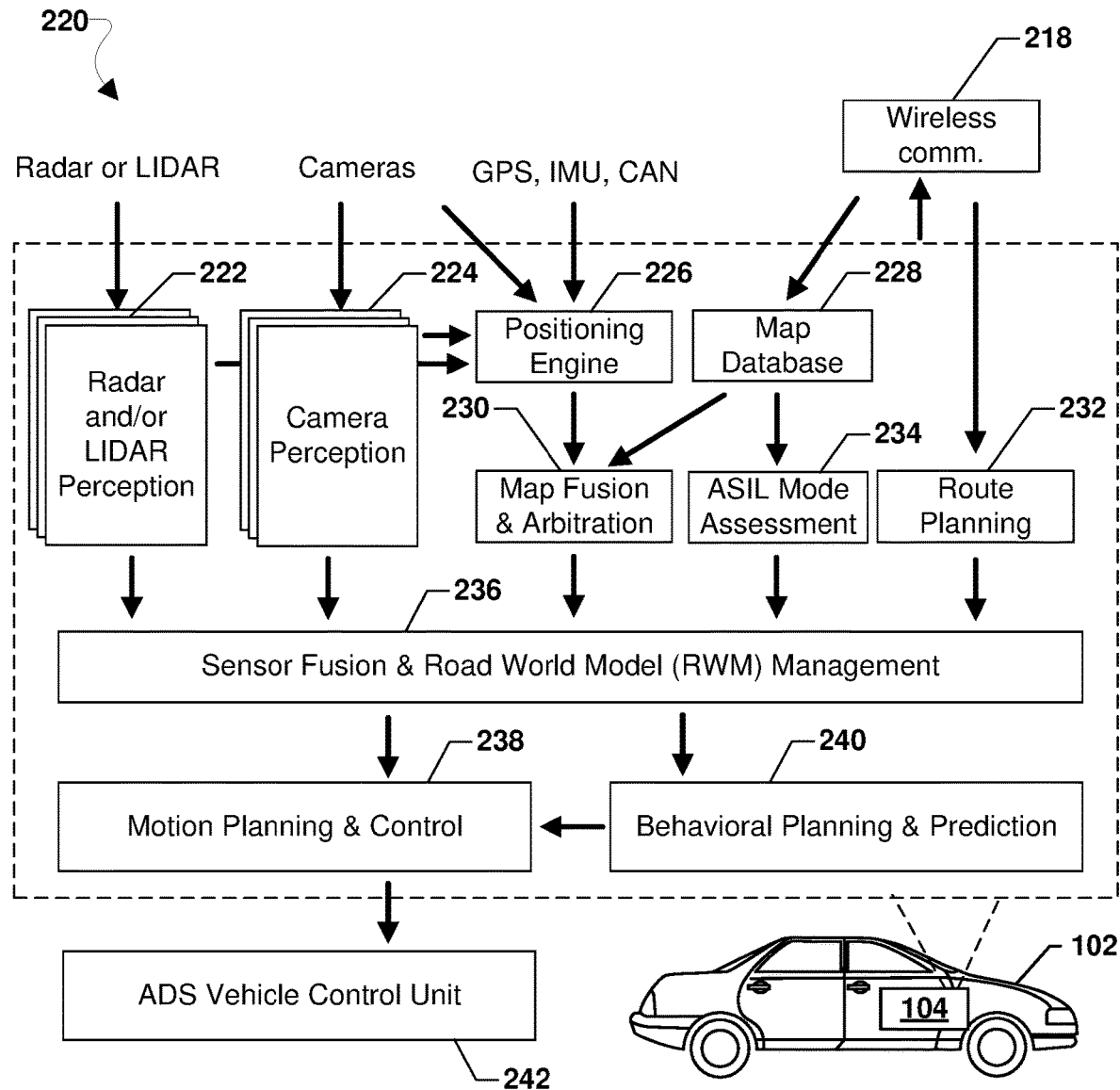
FIG. 2B is a component block diagram illustrating components of an example vehicle V2X system suitable for implementing various embodiments.

FIG. 2B is a component block diagram illustrating components of an example vehicle V2X system 220 (e.g., the V2X system 104) suitable for implementing various embodiments. The V2X system 220 may include various subsystems, communication elements, computational elements, computing devices or units which may be utilized within a vehicle 102. With reference to FIGS. 1A-2A, the various computational elements, computing devices or units within the V2X system 220 may be implemented within a system of computing devices (i.e., subsystems) that communicate data and commands to each other via the in-vehicle network 210 (e.g., indicated by the arrows in FIG. 2B). In some implementations, the various computational elements, computing devices or units within the V2X system 220 may be implemented within a single computing device, such as separate threads, processes, algorithms or computational elements. Therefore, each subsystem/computational element illustrated in FIG. 2B is also generally referred to herein as a "layer" within a computational "stack" that constitutes the vehicle V2X system 220. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The V2X system 220 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the V2X system 220. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the V2X system 220. Each of the layers 222-240 may exchange data, computational results and commands as illustrated by the arrows in FIG. 2B. Further, the V2X system 220 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data). The V2X system 220 may output vehicle control commands or signals to the ADS vehicle control unit 242, which is a system, subsystem or computing device that interfaces directly with vehicle steering, throttle and brake controls. The configuration of the V2X system 220 and ADS vehicle control unit 242 illustrated in FIG. 2A is merely an example configuration and other configurations of a vehicle management system and other vehicle components may be used. As an example, the configuration of the V2X system 220 and ADS vehicle control unit 242 illustrated in FIG. 2B may be used in a vehicle configured for autonomous or semi-autonomous operation while a different configuration may be used in a non-autonomous vehicle.

The radar and/or lidar perception layer 222 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras (e.g., 158, 160), and process the data to recognize and determine locations of other vehicles and objects within a vicinity of the vehicle 100. The camera perception layer 224 may include use of neural network processing and artificial intelligence methods to recognize objects and vehicles, and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 100. Various sources of navigation information may include, but is not limited to, a GPS receiver, an IMU, and/or other sources and sensors connected via a CAN bus. The positioning engine layer 226 may also utilize inputs from one or more cameras, such as cameras (e.g., 158, 160) and/or any other available sensor capable of identifying and determining directions and distances to objects in the vicinity of the vehicle, such as radars, lidars, etc.

The vehicle V2X system 220 may include or be coupled to a vehicle wireless communication subsystem 218. One or more of the layers 222-240 may provide information to or receive information from the wireless communication subsystem 218. The wireless communication subsystem 218 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 100. For example, the sensor fusion and RWM management layer 236 may combine imagery data from the camera perception layer 224 with arbitrated map location information from the map fusion and arbitration layer 230 to refine the determined position of the vehicle within a lane of traffic. As another example, the sensor fusion and RWM management layer 236 may combine object recognition and imagery data from the camera perception layer 224 with object detection and ranging data from the radar and/or lidar perception layer 222 to determine and refine the relative position of other vehicles and objects in the vicinity of the vehicle. As another example, the sensor fusion and RWM management layer 236 may receive information from V2X communications (such as via the CAN bus) regarding other vehicle positions and directions of travel, and combine that information with information from the radar and/or lidar perception layer 222 and the camera perception layer 224 to refine the locations and motions of other vehicles. The sensor fusion and RWM management layer 236 may output refined location and state information of the vehicle 100, as well as refined location and state information of other vehicles and objects in the vicinity of the vehicle, to the motion planning and control layer 238 and/or the behavior planning and prediction layer 240.

As a further example, the sensor fusion and RWM management layer 236 may use dynamic traffic control instructions directing the vehicle 102 to change speed, lane, direction of travel, or other navigational element(s), and combine that information with other received information to determine refined location and state information. The sensor fusion and RWM management layer 236 may output the refined location and state information of the vehicle 102, as well as refined location and state information of other vehicles and objects in the vicinity of the vehicle 100, to the motion planning and control layer 238, the behavior planning and prediction layer 240 and/or devices remote from the vehicle 102, such as a data server, other vehicles, etc., via wireless communications, such as through C-V2X connections, other wireless connections, etc.

As a still further example, the sensor fusion and RWM management layer 236 may monitor perception data from various sensors, such as perception data from a radar and/or lidar perception layer 222, camera perception layer 224, other perception layer, etc., and/or data from one or more sensors themselves to analyze conditions in the vehicle sensor data. The sensor fusion and RWM management layer 236 may be configured to detect conditions in the sensor data, such as sensor measurements being at, above, or below a threshold, certain types of sensor measurements occurring, etc., and may output the sensor data as part of the refined location and state information of the vehicle 102 provided to the behavior planning and prediction layer 240 and/or devices remote from the vehicle 100, such as a data server, other vehicles, etc., via wireless communications, such as through C-V2X connections, other wireless connections, etc.

The behavioral planning and prediction layer 240 of the autonomous vehicle V2X system 220 may use the refined location and state information of the vehicle 102 and location and state information of other vehicles and objects output from the sensor fusion and RWM management layer 236 to predict future behaviors of other vehicles and/or objects. For example, the behavioral planning and prediction layer 240 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 240 may output other vehicle and object behavior and location predictions to the motion planning and control layer 238. Additionally, the behavior planning and prediction layer 240 may use object behavior in combination with location predictions to plan and generate control signals for controlling the motion of the vehicle 102. For example, based on route planning information, refined location in the roadway information, and relative locations and motions of other vehicles, the behavior planning and prediction layer 240 may determine that the vehicle 102 needs to change lanes and accelerate, such as to maintain or achieve minimum spacing from other vehicles, and/or prepare for a turn or exit. As a result, the behavior planning and prediction layer 240 may calculate or otherwise determine a steering angle for the wheels and a change to the throttle setting to be commanded to the motion planning and control layer 238 and ADS vehicle control unit 242 along with such various parameters necessary to effectuate such a lane change and acceleration. One such parameter may be a computed steering wheel command angle.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 100. For example, based on route planning information, refined location in the roadway information, and relative locations and motions of other vehicles, the motion planning and control layer 238 may verify and pass various control commands or instructions to the ADS vehicle control unit 242.

The ADS vehicle control unit 242 may receive the commands or instructions from the motion planning and control layer 238 and translate such information into mechanical control signals for controlling wheel angle, brake and throttle of the vehicle 100. For example, ADS vehicle control unit 242 may respond to the computed steering wheel command angle by sending corresponding control signals to the steering wheel controller.

In various embodiments, the wireless communication subsystem 218 may communicate with other V2X system participants (e.g., other vehicles 12, 14, 16) via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the vehicle V2X system 220 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3A:
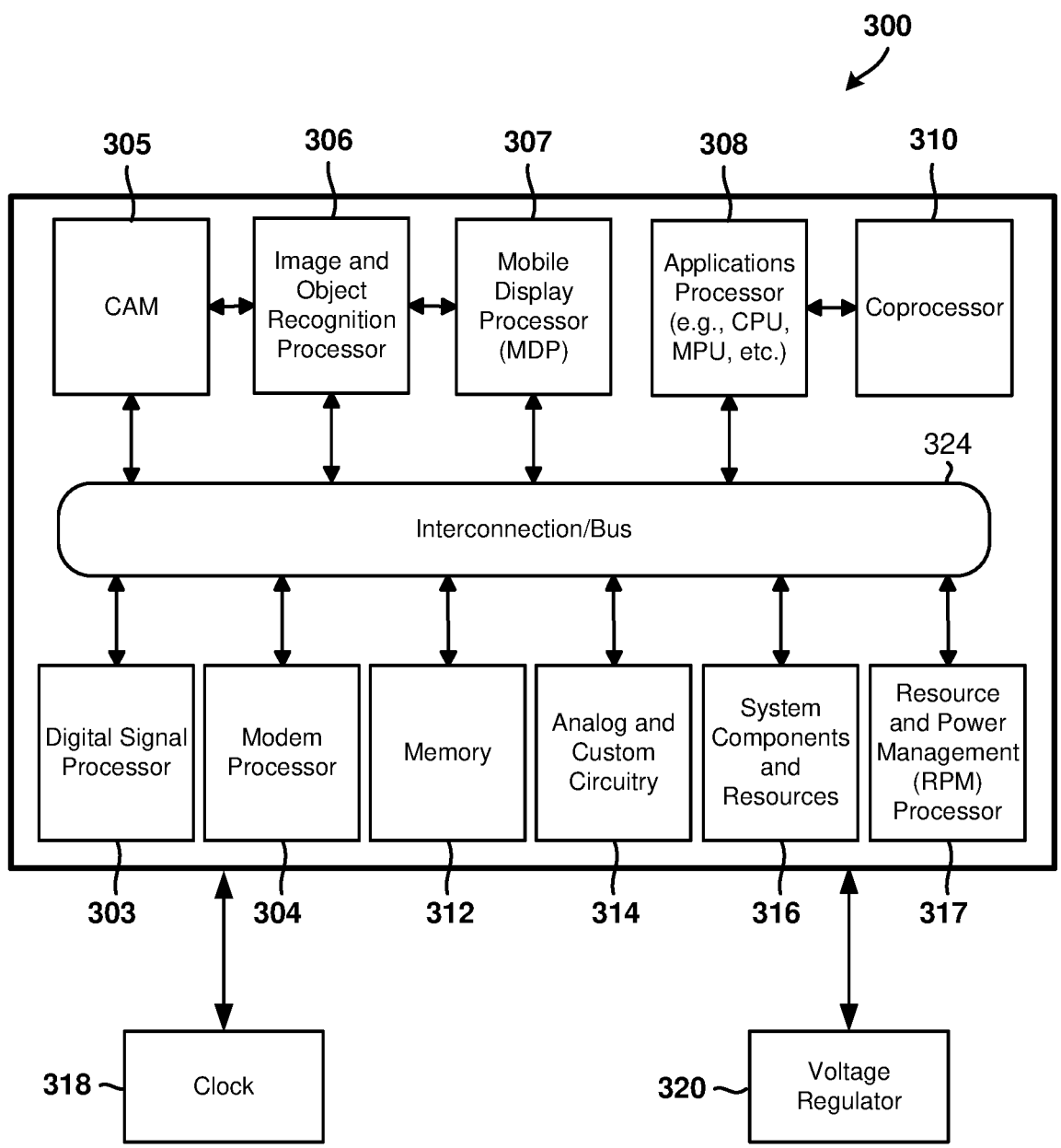
FIG. 3A is a block diagram illustrating components of a system on chip for use in a vehicle V2X processing system in accordance with various embodiments.

FIG. 3A is a block diagram illustrating an example components of a system on chip (SOC) 300 for use in a vehicle V2X processing system in accordance with various embodiments. With reference to FIGS. 1A-3A, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 158, 160) via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CareConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 3B:
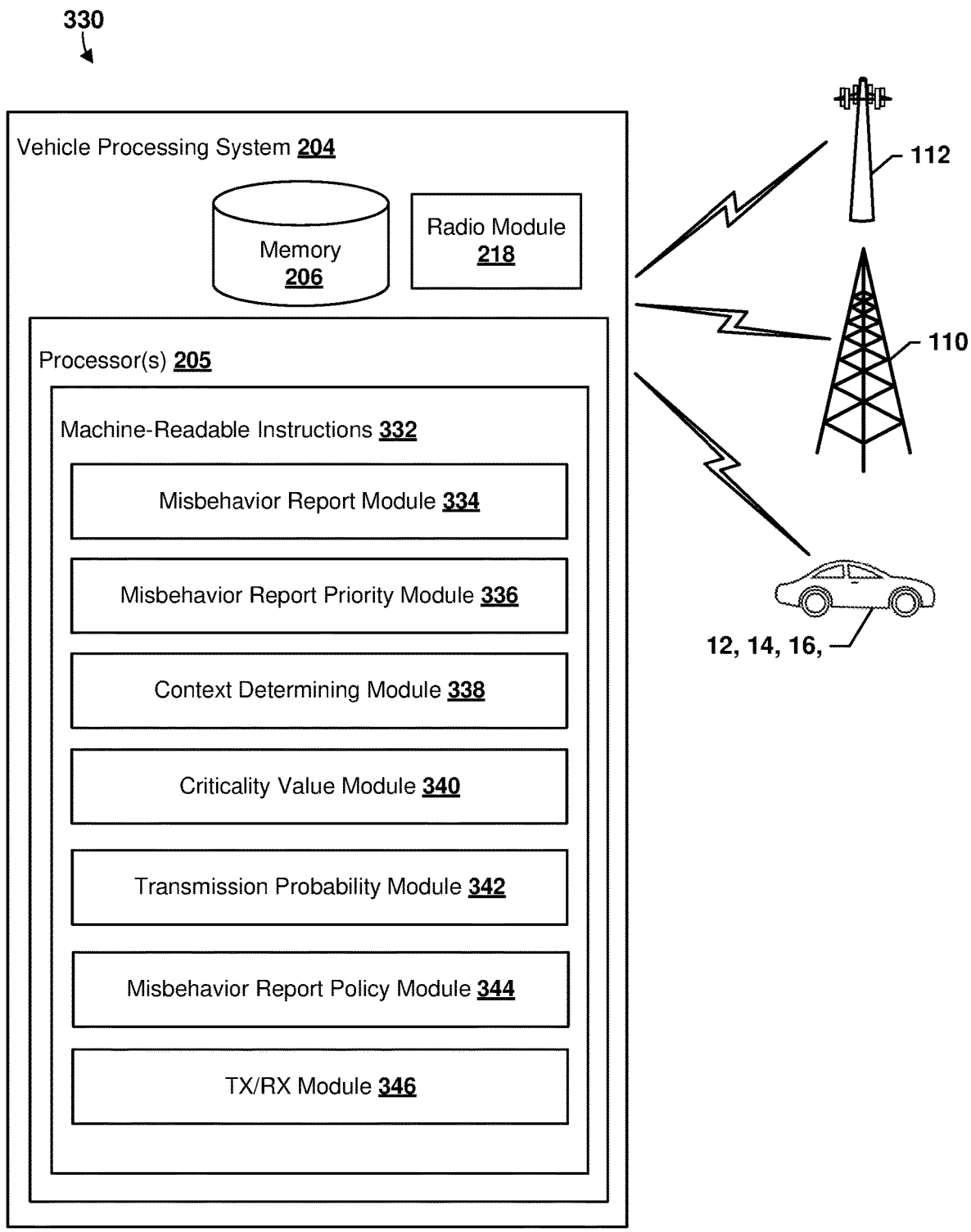
FIG. 3B is a component block diagram illustrating elements of a vehicle V2X system configured in accordance with various embodiments

FIG. 3B is a component block diagram illustrating elements of a vehicle V2X system 330 configured in accordance with various embodiments. With reference to FIGS. 1A-3B, the V2X system 330 may include a vehicle processing system 204 of a vehicle (e.g., 102), which may be configured to communicate with a roadside unit 112, a cellular network base station 110, and/or one or more other vehicles 12, 14, 16.

The vehicle processing system 204 may include one or more processors 205, memory 206, a radio module 218, and other components. The vehicle processing system 204 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 204 and/or removable storage that is removably connectable to the vehicle processing system 204 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The memory 206 may include one or more virtual storage resources (e.g., cloud storage, a virtual private network, and/or other virtual storage resources). Memory 206 may store software algorithms, information determined by processor(s) 205, information received from the one or more other vehicles 12, 14, 16, information received from the roadside unit 112, information received from the base station 110, and/or other information that enables the vehicle processing system 204 to function as described herein.

The processor(s) 205 may include one of more local processors that may be configured to provide information processing capabilities in the vehicle processing system 204. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3B as a single entity, this is for illustrative purposes only. In some embodiments, the processor(s) 205 may include a plurality of processing units. These processing units may be physically located within the same device, or the processor(s) 205 may represent processing functionality of a plurality of devices distributed in the vehicle and operating in coordination.

The vehicle processing system 204 may be configured by machine-readable instructions 332, which may include one or more instruction modules. The instruction modules may include computer program modules. In various embodiments, the instruction modules may include one or more of a misbehavior report module 334, a misbehavior report priority module 336, a context determining module 338, a criticality value module 340, a transmission probability module 342, a misbehavior report policy module 344, a transmit/receive (TX/RX) module 346, and/or other modules.

The misbehavior report module 334 may be configured to generate a misbehavior report based on a detected V2X misbehavior. The misbehavior report module 334 may be configured to transmit the misbehavior report based on the assigned priority (in some embodiments, with the TX/RX module 346). The misbehavior report module 334 may be configured to transmit the misbehavior report based on the assigned criticality value. The misbehavior report module 334 may be configured to transmit the misbehavior report based on the probability that the neighbor vehicle will report the detected V2X misbehavior.

The misbehavior report priority module 336 may be configured to assign a priority to the generated misbehavior report based on an external condition related to the detected V2X misbehavior. The misbehavior report priority module 336 may be configured to determine a probability that a neighbor vehicle will report the detected V2X misbehavior. The misbehavior report priority module 336 may be configured to assign a priority to the generated misbehavior report based on the parameters of a misbehavior report policy received from, e.g., an MA.

The context determining module 338 may be configured to determine for the misbehavior report an event type of the detected V2X misbehavior and determining a context of the detected V2X misbehavior based on an anticipated response to the detected V2X misbehavior. The context determining module 338 may be configured to determine the context based on a degree to which the anticipated response by the vehicle to the detected V2X misbehavior will deviate from a current behavior of the vehicle. The context determining module 338 may be configured to determine an anticipated response to the detected V2X misbehavior by one or more proximate vehicles. The context determining module 338 may be configured to determine a degree to which the detected V2X misbehavior deviates from a ground truth determined by the processor of the V2X system. The context determining module 338 may be configured to determine a number of V2X-enabled neighbor vehicles of the vehicle. The context determining module 338 may be configured to determine whether a number of neighbor vehicles proximate to the vehicle exceeds a threshold number of vehicles, determine distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles, and determine a number of vehicles that are closest to the location associated with the detected V2X misbehavior.

The criticality value module 340 may be configured to assign to the misbehavior report a criticality value based on the determined event type and the context of the detected V2X misbehavior.

The transmission probability module 342 may be configured to use the assigned criticality value as a weight factor together with other factors used in determining whether to transmit the misbehavior report. The transmission probability module 342 may be configured to determine a weighting factor based on a number of V2X-enabled neighbor vehicles. The transmission probability module 342 may be configured to take an action using the weighting factor to adjust a probability that the processor will transmit the misbehavior report The transmission probability module 342 may be configured to take an action to increase the probability that the processor will send the misbehavior report in response to determining that the vehicle is among the number of vehicles that are closest to the location associated with the detected V2X misbehavior. The transmission probability module 342 may be configured to take an action an action to decrease the probability that the processor will send the misbehavior report in response to determining that the vehicle is not among the number of vehicles that are closest to the location associated with the detected V2X misbehavior.

The misbehavior report policy module 344 may be configured to receive from a network computing device (e.g., the MA 74, 132) a misbehavior report policy that includes parameters usable by the processor to determine whether to send a misbehavior report. The misbehavior report policy module 344 may be configured to apply one or more of the parameters, which may include a time window, indication to increase the probability of the processor sending the misbehavior report, a threshold number of misbehavior reports related to a same V2X sender, and/or other suitable parameters usable by the processor to determine whether to send a misbehavior report.

The TX/RX module 346 may be configured to control the operations of communication devices of the vehicle processing system such as the radio module 218.

The processor(s) 205 may be configured to execute the modules 332-346 and/or other modules by software, hardware, firmware, some combination of software, hardware, and/or firmware, and/or other mechanisms for configuring processing capabilities on processor(s) 205.

The description of the functionality provided by the different modules 332-346 is for illustrative purposes, and is not intended to be limiting, as any of modules 332-346 may provide more or less functionality than is described. For example, one or more of modules 332-346 may be eliminated, and some or all of its functionality may be provided by other ones of modules 332-346. As another example, processor(s) 205 may be configured to execute one or more additional modules that may perform some or all of the functionality attributed below to one of modules 332-346.

Figure 4A:
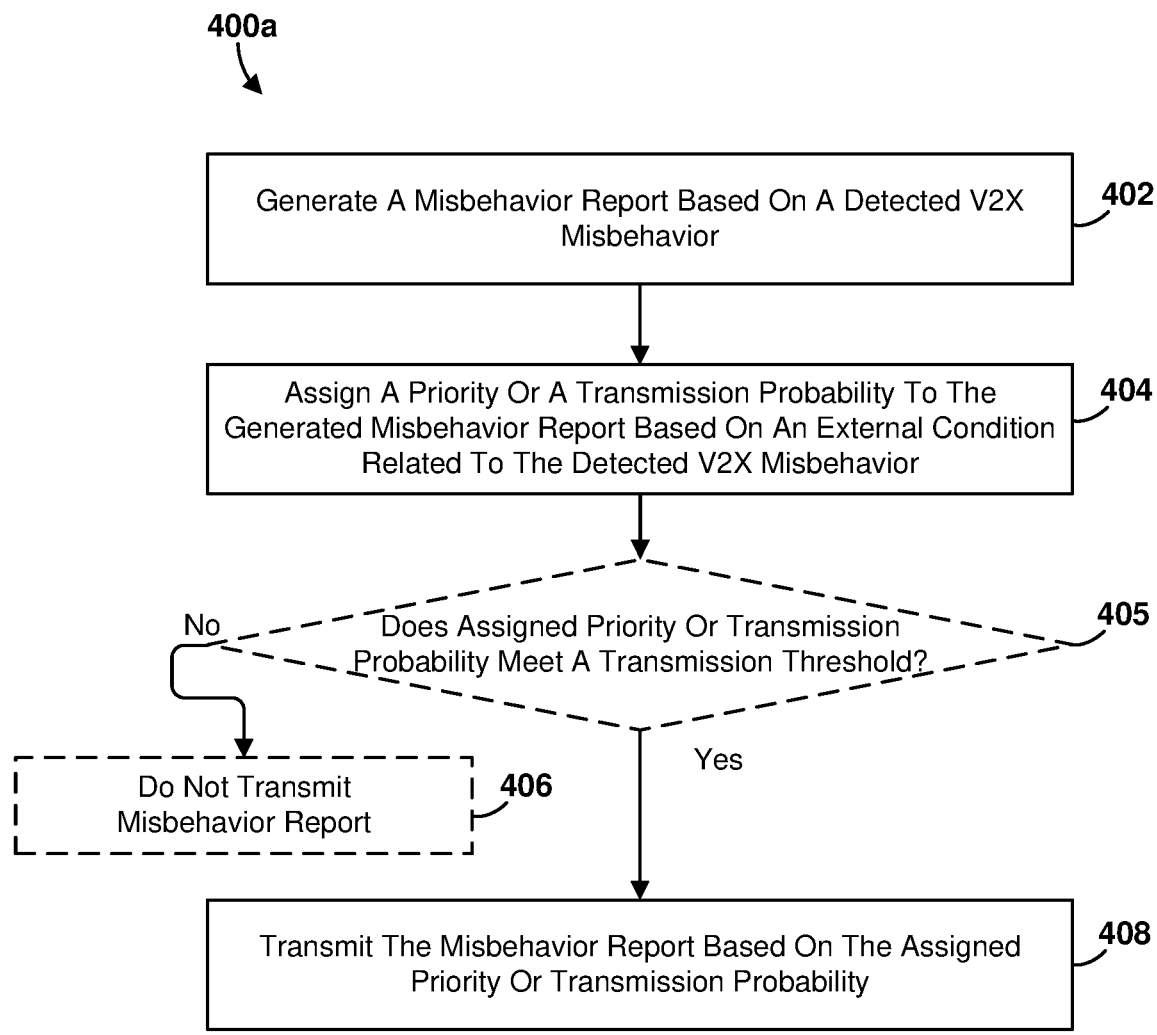
FIG. 4A is a process flow diagram of an example method performed by a processor of a vehicle V2X system for managing transmission of misbehavior reports in accordance with various embodiments.

FIG. 4A is a process flow diagram of an example method 400a performed by a processor of a vehicle V2X system for managing transmission of misbehavior reports in accordance with various embodiments. With reference to FIGS. 1A-4A, the method 400a may be performed by a processor (e.g., 205, 300) of a V2X system or other vehicle processor (e.g., 104, 204, 205, 220, 300) that may be implemented in hardware elements, software elements, or a combination of hardware and software elements (referred to collectively as a "vehicle processor").

In block 402, the vehicle processor may generate a misbehavior report based on a detected V2X misbehavior. Means for performing the operations of block 402 may include the processor (e.g., 205, 303, 304, 306, 307, 308, 310) executing the misbehavior report module 334 and the radio module 218.

In block 404, the vehicle processor may assign a priority or transmission probability to the generated misbehavior report based on an external condition related to the detected V2X misbehavior. Means for performing the operations of block 404 may include the processor (e.g., 205, 303, 304, 306, 307, 308, 310) executing the misbehavior report priority module 336.

In optional determination block 405, in some embodiments, the vehicle processor may determine whether the assigned priority or transmission probability meets a transmission threshold. Means for performing the operations of optional determination block 405 may include the processor (e.g., 205, 303, 304, 306, 307, 308, 310) executing the misbehavior report priority module 336.

In response to determining that the assigned priority or probability does not meet the transmission threshold (i.e., optional determination block 405="No"), the vehicle processor may not transmit the misbehavior report in optional block 406.

After vehicle processor assigns a priority to the generated misbehavior report based on an external condition related to the detected V2X misbehavior in block 404, or in response to determining that the assigned priority meets the transmission threshold (i.e., optional determination block 405="Yes"), the vehicle processor may store the generated and prioritized misbehavior report in a transmission buffer, and then determine whether to transmit a given misbehavior report during a transmission opportunity based on the assigned priority or probability in block 408. In some embodiments, the V2X system may transmit misbehavior reports that have been generated, prioritized and stored in a transmission buffer in the order of the assigned priority, with the highest priority misbehavior report stored in the buffer being transmitted at each V2X transmission opportunity. In some embodiments, the V2X system may determine whether an assigned probability of transmitting the misbehavior report meets a transmission criteria based on a generated random value, such as whether the probability is greater than or equal to the generated random value, and transmit the misbehavior report in response to determining that the transmission criteria is satisfied. In some embodiments, the V2X system may multiply an assigned transmission probability times a random value, compare the product to a threshold, and transmit the misbehavior report in response to determining that the product of multiplying the probability of transmitting the misbehavior report by the generated random value exceeds the threshold. Means for performing the operations of block 406 may include the processor (e.g., 205, 303, 304, 306, 307, 308, 310) executing the misbehavior report module 334 and the TX/RX module 334 and the radio module 218.

FIGS. 4B-4E are process flow diagrams of example operations 400b-400e that may be performed by a processor of a vehicle V2X system as part of the method 400a for managing transmission of misbehavior reports in accordance with various embodiments. With reference to FIGS. 1A-4E, the operations 400b-400e may be performed by a processor (e.g., 205, 300) of a V2X system or other vehicle processor (e.g., 104, 204, 205, 220, 300) that may be implemented in hardware elements, software elements, or a combination of hardware and software elements (referred to collectively as a "vehicle processor").

Figure 4B:
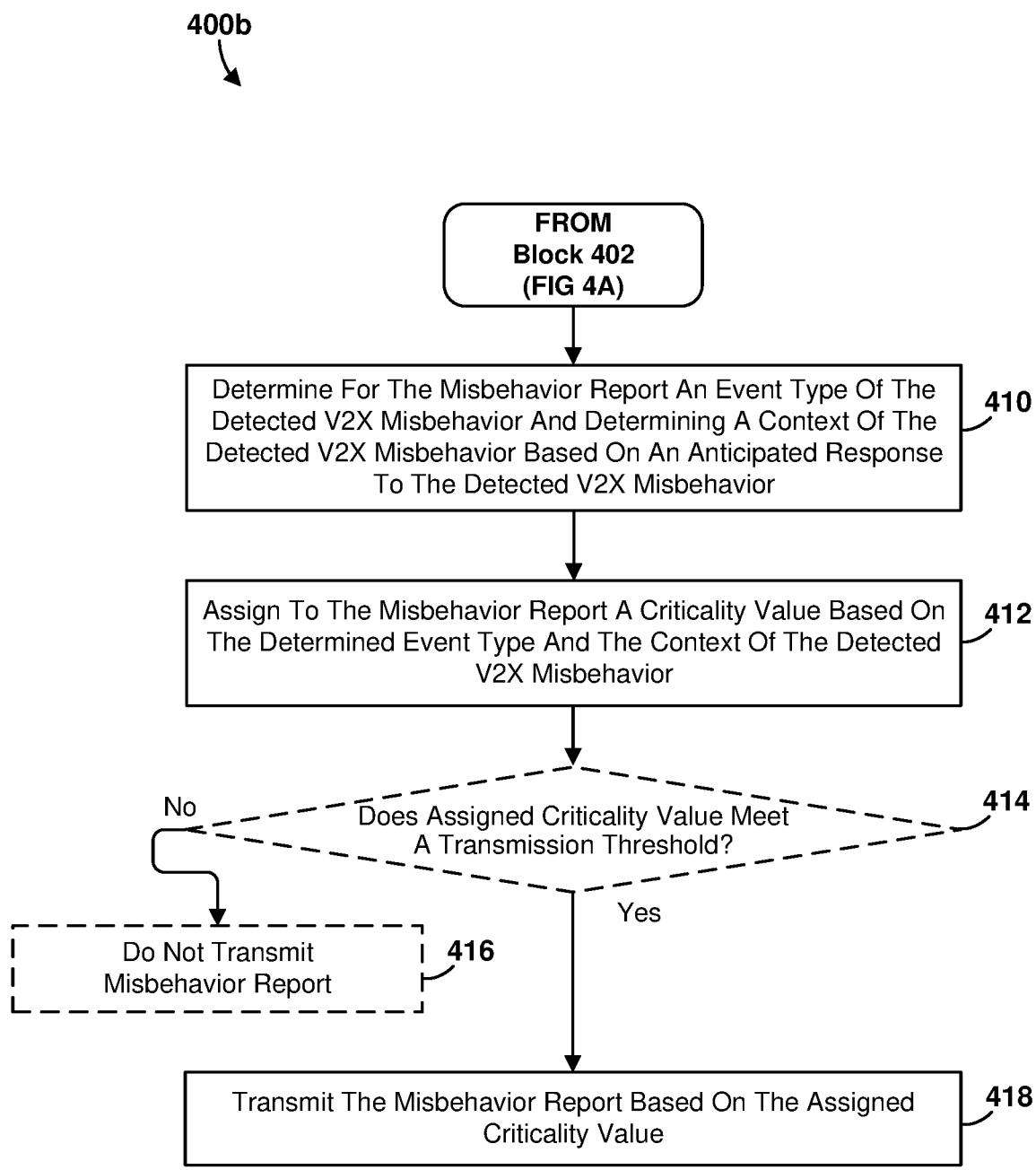
FIGS. 4B-4E are process flow diagrams of example operations that may be performed by a processor of a vehicle V2X system as part of the method for managing transmission of misbehavior reports in accordance with various embodiments.

With reference to FIG. 4B, after performing the operations of generating a misbehavior report based on a detected V2X misbehavior in block 402 as described, the vehicle processor may determine for the misbehavior report an event type of the detected V2X misbehavior and determine a context of the detected V2X misbehavior based on an anticipated response to the detected V2X misbehavior in block 410. In some embodiments, the vehicle processor may determine the context based on a degree to which the anticipated response by the vehicle to the detected V2X misbehavior will deviate from a current behavior of the vehicle. In some embodiments, the vehicle processor may determine an anticipated response to the detected V2X misbehavior by one or more proximate vehicles. In some embodiments, the vehicle processor may determine a degree to which the detected V2X misbehavior deviates from a ground truth determined by the processor of the V2X system. Means for performing the operations of block 410 may include the processor (e.g., 205, 303, 304, 306, 307, 308, 310) executing the misbehavior report module 334 and the context determining module 338, the sensors 214, and the radio module 218.

In block 412, the vehicle processor may assign to the misbehavior report a criticality value based on the determined event type and the context of the detected V2X misbehavior. Means for performing the operations of block 412 may include the processor (e.g., 205, 303, 304, 306, 307, 308, 310) executing the criticality value module 340.

In optional determination block 414, in some embodiments, the vehicle processor may determine whether the assigned criticality value meets a transmission threshold. Means for performing the operations of optional determination block 414 may include the processor (e.g., 205, 303, 304, 306, 307, 308, 310) executing the misbehavior report priority module 336.

In response to determining that the assigned criticality value does not meet the transmission threshold (i.e., optional determination block 414="No"), the vehicle processor may not transmit the misbehavior report in optional block 416.

After vehicle processor assigns a criticality value to the generated misbehavior report based on an external condition related to the detected V2X misbehavior in block 412, or in response to determining that the assigned priority meets the transmission threshold (i.e., optional determination block 414="Yes"), the vehicle processor may store the generated and prioritized misbehavior report in a transmission buffer, and then transmit the misbehavior report based on the assigned criticality value in block 418. In some embodiments, the V2X system may transmit misbehavior reports stored in a transmission buffer in the order of the assigned criticality value, so that misbehavior report stored in the buffer with the highest priority are transmitted at each V2X transmission opportunity.

In some embodiments, the vehicle processor may use the assigned criticality value as a transmission probability value or to assign a transmission probability value for use in determining whether to transmit the misbehavior report. In some embodiments, the V2X system may determine whether a transmission probability assigned to the misbehavior report meets a transmission criteria based on a generated random value, such as whether the probability is greater than or equal to the generated random value, and transmit the misbehavior report in response to determining that the transmission criteria is satisfied. In some embodiments, the V2X system may multiply an assigned transmission probability by a random value, compare the product to a threshold, and transmit the misbehavior report in response to determining that the product of multiplying the probability of transmitting the misbehavior report by the generated random value meets or exceeds the threshold.

In some embodiments, the vehicle processor may use the assigned criticality value as a weight factor in determining whether to transmit the misbehavior report. For example, the processor may determine a probability that the processor may transmit the misbehavior report. In some embodiments, the processor may determine or assign to the misbehavior report a baseline or initial probability of transmitting the misbehavior report, and then adjust (e.g., increase or decrease) the probability of transmitting the misbehavior report based on the criticality value. In some embodiments, the vehicle processor may generate a random value, and use the generated random value and the adjusted transmission probability to determine whether to transmit the misbehavior report. In some embodiments, the V2X system may determine whether an assigned probability of transmitting the misbehavior report meets a transmission criteria based on a generated random value, such as whether the probability is greater than or equal to the generated random value, and transmit the misbehavior report in response to determining that the transmission criteria is satisfied. In some embodiments, the V2X system may multiply an assigned transmission probability times a random value, compare the product to a threshold, and transmit the misbehavior report in response to determining that the product of multiplying the transmission probability by the generated random value exceeds the threshold.

Means for performing the operations of block 418 may include the processor (e.g., 205, 303, 304, 306, 307, 308, 310) executing the transmission probability module 342 and the TX/RX module 334, and the radio module 218.

Figure 4C:
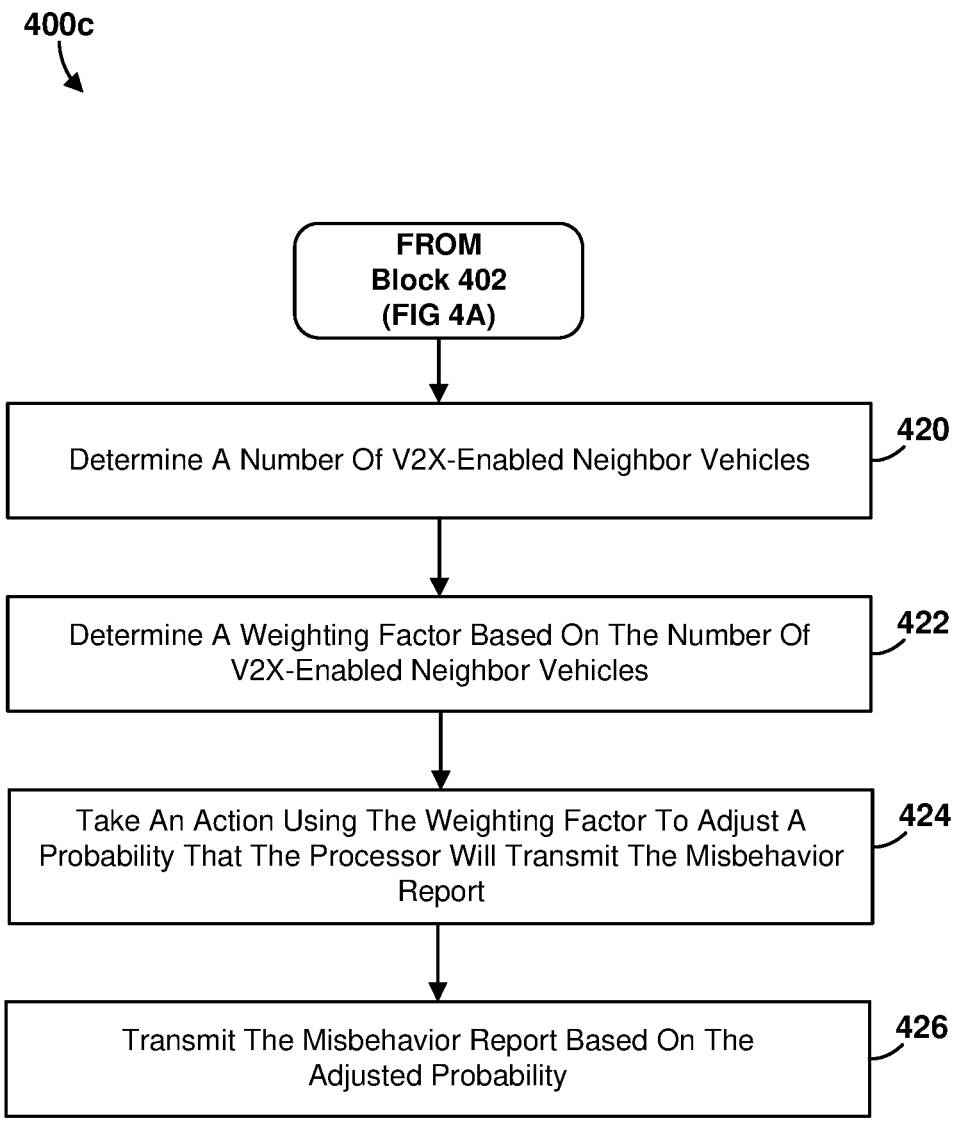

With reference to FIG. 4C, after performing the operations of generating a misbehavior report based on a detected V2X misbehavior in block 402 as described, the vehicle processor may determine a number of V2X-enabled neighbor vehicles in block 420. Means for performing the operations of block 420 may include the processor (e.g., 205, 303, 304, 306, 307, 308, 310) executing the context determining module 338.

In block 422, the vehicle processor may determine a weighting factor based on the number of V2X-enabled neighbor vehicles. For example, the vehicle processor may detect or identify a number n of V2X-enabled vehicles. The vehicle processor may determine a weighting factor based on the number n of V2X-enabled vehicles. In some embodiments, the weighting factor may be represented as f (n)=, where f(n) represents the weighting factor, n represents the number of proximate V2X-enabled vehicles, c represents a constant (e.g., 10) that scales the weighting factor with the number of reporting vehicles n, and e represents a constant (e.g., Euler's number). Means for performing the operations of block 422 may include the processor (e.g., 205, 303, 304, 306, 307, 308, 310) executing the transmission probability module 342.

In block 424, the vehicle processor may take an action using the weighting factor to adjust a probability that the processor will transmit the misbehavior report. In some embodiments, the V2X system may perform a mathematical operation using the weighting factor to adjust a probability that the processor will transmit the misbehavior report. In this manner, the V2X system may adjust the probability that the processor will transmit the misbehavior report based on the number of V2X-enabled neighbor vehicles such that the overall number of misbehavior reports about the same V2X misbehavior that are transmitted to the MA is reduced. Means for performing the operations of block 424 may include the processor (e.g., 205, 303, 304, 306, 307, 308, 310) executing the transmission probability module 342.

In block 426, the vehicle processor may transmit the misbehavior report based on the adjusted transmission probability. In some embodiments, the V2X system may determine whether an assigned probability of transmitting the misbehavior report meets a transmission criteria based on a generated random value, such as whether the probability is greater than or equal to the generated random value, and transmit the misbehavior report in response to determining that the transmission criteria is satisfied. In some embodiments, the V2X system may multiply an assigned transmission probability times a random value, compare the product to a threshold, and transmit the misbehavior report in response to determining that the product of multiplying the transmission probability by the generated random value exceeds the threshold. Means for performing the operations of block 426 may include the processor (e.g., 205, 303, 304, 306, 307, 308, 310) executing the transmission probability module 342, the misbehavior report module 334, and the TX/RX module 346.

Figure 4D:
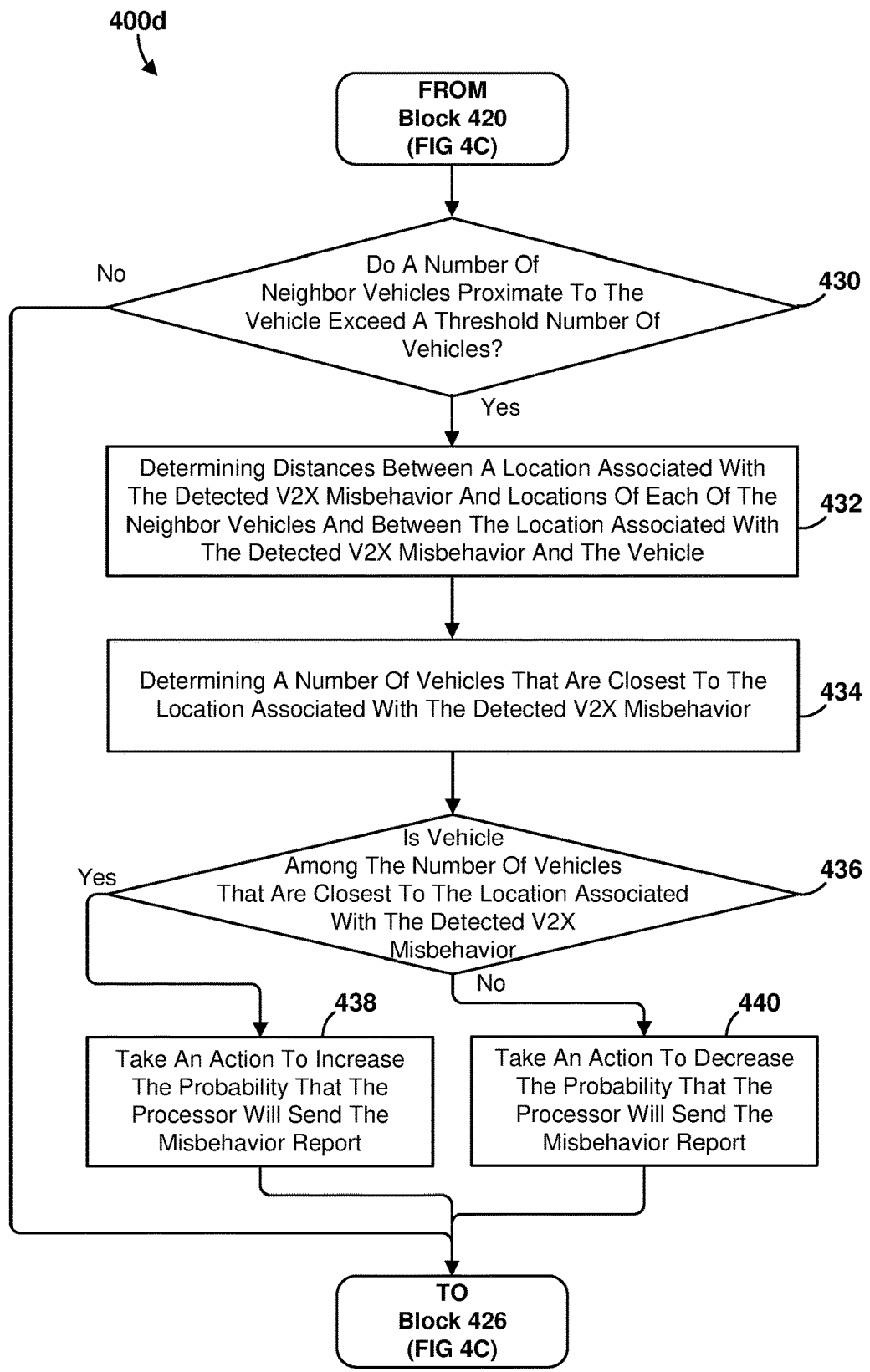

With reference to FIG. 4D, after determining a probability that a neighbor vehicle will report the detected V2X misbehavior in block 420 as described, the vehicle processor may determine whether a number of neighbor vehicles proximate to the vehicle exceeds a threshold number of vehicles in determination block 430. Means for performing the operations of determination block 430 may include the processor (e.g., 205, 303, 304, 306, 307, 308, 310) executing the context determining module 338.

In response to determining that the number of neighbor vehicles proximate to the vehicle does not exceed a threshold number of vehicles (i.e., determination block 430="No"), the vehicle processor may transmit the misbehavior report based on the probability that the neighbor vehicle will report the detected V2X misbehavior in block 422 as described.

In response to determining that the number of neighbor vehicles proximate to the vehicle exceeds a threshold number of vehicles (i.e., determination block 430="Yes"), the vehicle processor may determine distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles in block 432. Means for performing the operations of block 432 may include the processor (e.g., 205, 303, 304, 306, 307, 308, 310) executing the context determining module 338.

In block 434, the vehicle processor may determine a number of vehicles that are closest to the location associated with the detected V2X misbehavior. Means for performing the operations of block 434 may include the processor (e.g., 205, 303, 304, 306, 307, 308, 310) executing the context determining module 338.

In determination block 436, the vehicle processor may determine whether the vehicle is among the number of vehicles that are closest to the location associated with the detected V2X misbehavior. Means for performing the operations of block 436 may include the processor (e.g., 205, 303, 304, 306, 307, 308, 310) executing the context determining module 338.

In response to determining that the vehicle is among the number of vehicles that are closest to the location associated with the detected V2X misbehavior (i.e., determination block 436="Yes"), the vehicle processor may take an action to increase the probability that the processor will send the misbehavior report in response in block 438. Means for performing the operations of block 438 may include the processor (e.g., 205, 303, 304, 306, 307, 308, 310) executing the transmission probability module 342.

In response to determining that the vehicle is not among the number of vehicles that are closest to the location associated with the detected V2X misbehavior (i.e., determination block 436="No"), the vehicle processor may take an action to decrease the probability that the processor will send the misbehavior report in response in block 440. Means for performing the operations of block 440 may include the processor (e.g., 205, 303, 304, 306, 307, 308, 310) executing the transmission probability module 342.

After performing the operations of blocks 438 or 440, the vehicle processor may transmit the misbehavior report based on the probability that the neighbor vehicle will report the detected V2X misbehavior in block 426 as described.

Figure 4E:
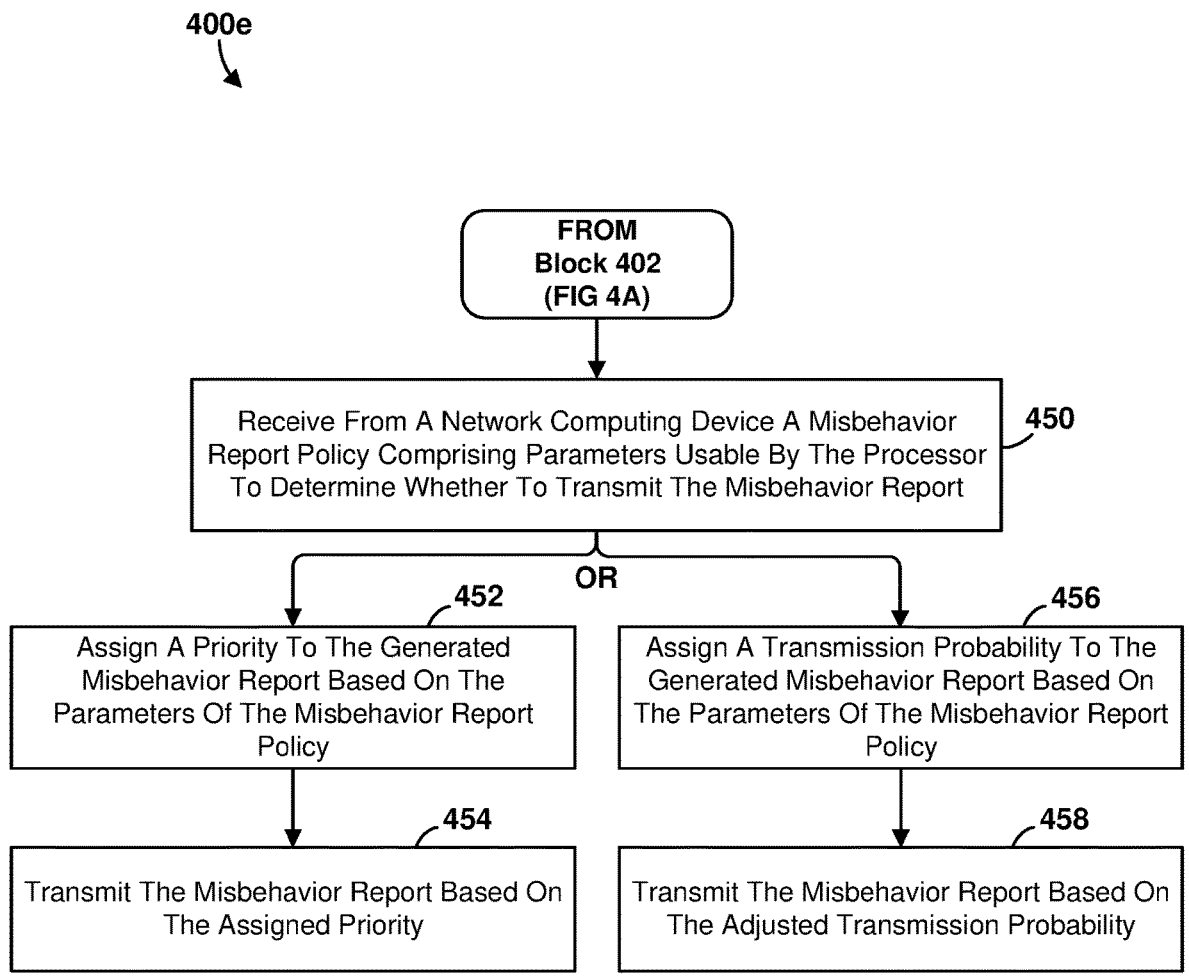

With reference to FIG. 4E, after performing the operations of generating a misbehavior report based on a detected V2X misbehavior in block 402 as described, the vehicle processor may receive from a network computing device (e.g., the MA 74, 132) a misbehavior report policy that includes parameters usable by the vehicle processor to determine whether to transmit the misbehavior report in block 450. Means for performing the operations of block 450 may include the processor (e.g., 205, 303, 304, 306, 307, 308, 310) executing the misbehavior report policy module 344 and the radio module 218.

In block 452, in some embodiments, the vehicle processor may assign a priority to the generated misbehavior report based on the parameters of the misbehavior report policy. In some embodiments, the vehicle processor may adjust an assigned priority of the misbehavior report based on the parameters of the misbehavior report policy. In some embodiments, the misbehavior report policy parameters may include a time window. In such embodiments, the vehicle processor may take an action to assign a relatively high priority, or to increase an assigned priority, of the misbehavior report in response to determining that the misbehavior report was generated during the time window. In some embodiments, the misbehavior report policy parameters may include an indication to increase the priority of the misbehavior report. For example, the policy parameters may indicate that a certain type or types of V2X misbehavior should be reported preferentially to the MA. In such embodiments, the vehicle processor may take an action to increase the priority of the misbehavior report in response to the indication in the misbehavior report policy parameters. In some embodiments, the misbehavior report policy parameters may include a threshold number of misbehavior reports related to a same V2X sender. In such embodiments, the vehicle processor may take an action to increase the priority of the misbehavior report in response to determining that a number of V2X reports generated by the processor that are related to the same V2X sender meets the threshold included in the misbehavior report policy parameters. Means for performing the operations of block 452 may include the processor (e.g., 205, 303, 304, 306, 307, 308, 310) executing the misbehavior report policy module 344 and the misbehavior report priority module 336.

In block 454, the vehicle processor may transmit the misbehavior report based on the assigned priority. In some embodiments, the vehicle processor may transmit the misbehavior report based on the adjusted priority. Means for performing the operations of block 454 may include the processor (e.g., 205, 303, 304, 306, 307, 308, 310) executing the misbehavior report policy module 344, the misbehavior report priority module 336, and the TX/RX module 346, and the radio module 218.

In block 456, in some embodiments, the vehicle processor may assign a transmission probability to the generated misbehavior report based on the parameters of the misbehavior policy. In some embodiments the vehicle processor also may take an action to adjust the probability that the processor will transmit the misbehavior report. In some embodiments, the misbehavior report policy parameters may include a time window. In such embodiments, the vehicle processor may take an action to increase the probability that the processor will send the misbehavior report in response to determining that the misbehavior report was generated during the time window. In some embodiments, the misbehavior report policy parameters may include an indication to increase the probability of the processor sending the misbehavior report. In such embodiments, the vehicle processor may take an action to increase the probability that the processor will send the misbehavior report in response to the indication in the misbehavior report policy parameters. In some embodiments, the misbehavior report policy parameters may include a threshold number of misbehavior reports related to a same V2X sender. In such embodiments, the vehicle processor may take an action to increase the probability that the processor will transmit the misbehavior report in response to determining that a number of V2X reports generated by the processor that are related to the same V2X sender meets the threshold included in the misbehavior report policy parameters. Means for performing the operations of block 456 may include the processor (e.g., 205, 303, 304, 306, 307, 308, 310) executing the misbehavior report policy module 344 and the transmission probability module 342.

In block 458, the vehicle processor may transmit the misbehavior report based on the adjusted probability (i.e., that the vehicle processor will transmit the misbehavior report). In some embodiments, the V2X system may determine whether an assigned probability of transmitting the misbehavior report meets a transmission criteria based on a generated random value, such as whether the probability is greater than or equal to the generated random value, and transmit the misbehavior report in response to determining that the transmission criteria is satisfied. In some embodiments, the V2X system may multiply an assigned transmission probability times a random value, compare the product to a threshold, and transmit the misbehavior report in response to determining that the product of multiplying the transmission probability by the generated random value exceeds the threshold. Means for performing the operations of block 458 may include the processor (e.g., 205, 303, 304, 306, 307, 308, 310) executing the misbehavior report policy module 344 and the transmission probability module 342, the TX/RX module 346, and the radio module 218.

In various embodiments, a V2X system may be configured to perform any or all of the above-described operations in any combination. For example, a V2X system may be configured to determine a context of a detected V2X misbehavior, and to assign a criticality value to a relevant misbehavior report based on the determined event type and the context of the detected V2X misbehavior. The V2X system also may determine a weighting factor based on a number of V2X-enabled vehicles that are neighbors to the vehicle and/or proximate to the detected V2X misbehavior, and may take an action using the weighting factor to adjust a probability that the processor will transmit the misbehavior report. The V2X system also may receive a reporting policy from a network computing device (e.g., an MA) indicating that, for example, vehicles should preferentially send (i.e., increase the priority of, or increase the probability of the V2X system sending) misbehavior reports of a specified type. In such embodiments, the V2X system may perform a combination of operations to adjust a priority of a misbehavior report, or to adjust a probability that the V2X system may transmit the misbehavior report.

Figure 5:
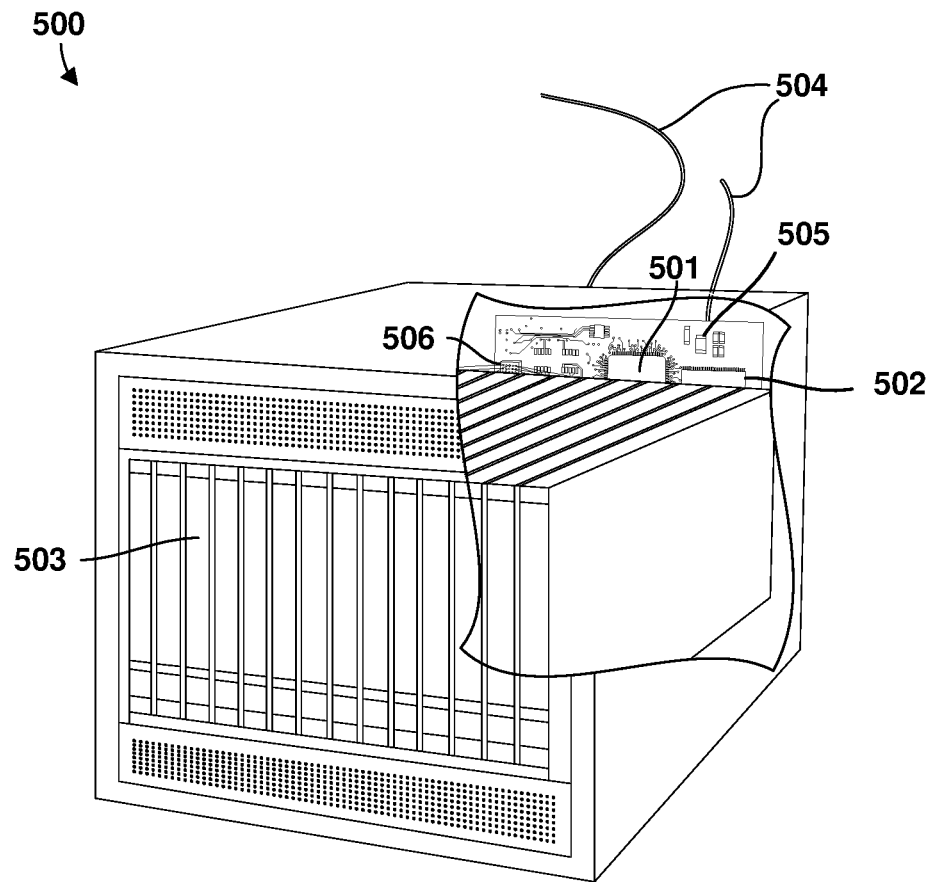
FIG. 5 is a component block diagram of a computing device suitable for use with various embodiments.

FIG. 5 is a component block diagram of a network computing device suitable for use with various embodiments. With reference to FIGS. 1A-5, various embodiments (including, but not limited to, embodiments described with reference to FIGS. 6A-6E) may be implemented on a variety of computing devices, an example of which is illustrated in FIG. 5 in the form of a server computing device 500. A computing device 500 may include a processor 501 coupled to volatile memory 502 and a large capacity nonvolatile memory, such as a disk drive 503. The computing device 500 may also include a peripheral memory access device such as a floppy disc drive, compact disc (CD) or digital video disc (DVD) drive 506 coupled to the processor 501. The computing device 500 may also include network access ports 504 (or interfaces) coupled to the processor 501 for establishing data connections with a network, such as the Internet and/or a local area network coupled to other system computers and servers. The computing device 500 may include one or more transceivers 505 for sending and receiving electromagnetic radiation that may be connected to a wireless communication link. The computing device 500 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a vehicle processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a vehicle processing device including means for performing functions of the methods of the following implementation examples; and the example methods discussed in the following paragraphs may be implemented as a non-transitory processor-readable storage medium having stored thereon processor-executable instructions configured to cause a processor of a vehicle processing device to perform the operations of the methods of the following implementation examples.

Example 1. A method performed by a processor of a vehicle-to-everything (V2X) system of a vehicle for managing transmission of misbehavior reports, including generating a misbehavior report based on a detected V2X misbehavior, assigning a priority or a transmission probability to the generated misbehavior report based on an external condition related to the detected V2X misbehavior, and transmitting the misbehavior report based on the assigned priority or transmission probability.

Example 2. The method of example 1, in which assigning a priority or a transmission probability to the generated misbehavior report based on an external condition related to the detected V2X misbehavior includes determining for the misbehavior report an event type of the detected V2X misbehavior and determining a context of the detected V2X misbehavior based on an anticipated response to the detected V2X misbehavior, and assigning to the misbehavior report a criticality value based on the determined event type and the context of the detected V2X misbehavior, in which transmitting the misbehavior report based on the assigned priority includes transmitting the misbehavior report based on the assigned criticality value.

Example 3. The method of example 2, in which determining the context of the detected V2X misbehavior based on an anticipated response to the detected V2X misbehavior includes determining the context based on a degree to which the anticipated response by the vehicle to the detected V2X misbehavior will deviate from a current behavior of the vehicle.

Example 4. The method of example 2, in which determining the context of the detected V2X misbehavior based on an anticipated response to the detected V2X misbehavior includes determining an anticipated response to the detected V2X misbehavior by one or more proximate vehicles.

Example 5. The method of example 2, in which determining the context of the detected V2X misbehavior based on an anticipated response to the detected V2X misbehavior includes determining a degree to which the detected V2X misbehavior deviates from a ground truth determined by a processor of the V2X system.

Example 6. The method of example 2, in which transmitting the misbehavior report based on the assigned criticality value includes using the assigned criticality value as a weight factor together with other factors used in determining whether to transmit the misbehavior report.

Example 7. The method of any of examples 1-6, in which assigning a priority or a transmission probability to the generated misbehavior report based on an external condition related to the detected V2X misbehavior includes determining a number of V2X-enabled neighbor vehicles, determining a weighting factor based on the number of V2X-enabled neighbor vehicles, and using the weighting factor to adjust the transmission probability, and transmitting the misbehavior report based on the assigned priority or transmission probability includes transmitting the misbehavior report based on the adjusted transmission probability.

Example 8. The method of example 7, further including determining whether a number of neighbor vehicles proximate to the vehicle exceeds a threshold number of vehicles, determining distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles, determining a number of vehicles that are closest to the location associated with the detected V2X misbehavior, taking an action to increase the probability that the processor will send the misbehavior report in response to determining that the vehicle is among the number of vehicles that are closest to the location associated with the detected V2X misbehavior, and taking an action to decrease the probability that the processor will send the misbehavior report in response to determining that the vehicle is not among the number of vehicles that are closest to the location associated with the detected V2X misbehavior.

Example 9. The method of any of examples 1-8, in which assigning a priority or a transmission probability to the generated misbehavior report based on an external condition related to the detected V2X misbehavior includes receiving from a network computing device a misbehavior report policy including parameters usable by the processor to determine whether to send a misbehavior report, and assigning the priority or the transmission probability to the generated misbehavior report based on the parameters of the misbehavior report policy. Example 10. The method of example 9, in which the misbehavior report policy parameters include a time window, and in which assigning a priority or a transmission probability to the generated misbehavior report based on the parameters of the misbehavior report policy includes taking an action to increase the probability that the processor will send the misbehavior report in response to determining that the misbehavior report was generated during the time window.

Example 11. The method of example 9, in which the misbehavior report policy parameters include an indication to increase the probability of the processor sending the misbehavior report, and in which assigning a priority or a transmission probability to the generated misbehavior report based on the parameters of the misbehavior report policy includes taking an action to adjust the probability that the processor will send the misbehavior report in response to the indication in the misbehavior report policy parameters.

Example 12. The method of example 9, in which the misbehavior report policy parameters include a threshold number of misbehavior reports related to a same V2X sender, and in which assigning a priority or a transmission probability to the generated misbehavior report based on the parameters of the misbehavior report policy includes sending the misbehavior report in response to determining that a number of V2X reports generated by the processor that are related to the same V2X sender meets the threshold included in the misbehavior report policy parameters.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle-to-everything (V2X) system of a vehicle for managing transmission of misbehavior reports, comprising:
   detecting a V2X misbehavior based on detecting inaccurate or intentionally false information in a V2X message;
   generating a misbehavior report based on the detected V2X misbehavior;
   assigning a priority or a transmission probability to the generated misbehavior report based on an external condition related to the detected V2X misbehavior; and
   transmitting the misbehavior report based on the assigned priority or transmission probability.

2. The method of claim 1, wherein assigning a priority or a transmission probability to the generated misbehavior report based on an external condition related to the detected V2X misbehavior comprises:

determining for the misbehavior report an event type of the detected V2X misbehavior and determining a context of the detected V2X misbehavior based on an anticipated response to the detected V2X misbehavior; and assigning to the misbehavior report a criticality value based on the determined event type and the context of the detected V2X misbehavior, wherein transmitting the misbehavior report based on the assigned priority comprises transmitting the misbehavior report based on the assigned criticality value.

3. The method of claim 2, wherein determining the context of the detected V2X misbehavior based on an anticipated response to the detected V2X misbehavior comprises determining the context based on a degree to which the anticipated response by the vehicle to the detected V2X misbehavior will deviate from a current behavior of the vehicle.

4. The method of claim 2, wherein determining the context of the detected V2X misbehavior based on an anticipated response to the detected V2X misbehavior comprises determining an anticipated response to the detected V2X misbehavior by one or more proximate vehicles.

5. The method of claim 2, wherein determining the context of the detected V2X misbehavior based on an anticipated response to the detected V2X misbehavior comprises determining a degree to which the detected V2X misbehavior deviates from a ground truth determined by a processor of the V2X system.

6. The method of claim 2, wherein transmitting the misbehavior report based on the assigned criticality value comprises using the assigned criticality value as a weight factor together with other factors used in determining whether to transmit the misbehavior report.

7. The method of claim 1, wherein:
assigning a priority or a transmission probability to the generated misbehavior report based on an external condition related to the detected V2X misbehavior comprises:
  determining a number of V2X-enabled neighbor vehicles;
  determining a weighting factor based on the number of V2X-enabled neighbor vehicles; and
  using the weighting factor to adjust the transmission probability; and
transmitting the misbehavior report based on the assigned priority or transmission probability comprises transmitting the misbehavior report based on the adjusted transmission probability.

8. The method of claim 7, further comprising:
determining whether a number of neighbor vehicles proximate to the vehicle exceeds a threshold number of vehicles;
determining distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles;
determining a number of vehicles that are closest to the location associated with the detected V2X misbehavior;
taking an action to increase the probability that the processor will send the misbehavior report in response to determining that the vehicle is among the number of vehicles that are closest to the location associated with the detected V2X misbehavior; and
taking an action to decrease the probability that the processor will send the misbehavior report in response to determining that the vehicle is not among the number of vehicles that are closest to the location associated with the detected V2X misbehavior.

9. The method of claim 1, wherein assigning a priority or a transmission probability to the generated misbehavior report based on an external condition related to the detected V2X misbehavior comprises:
receiving from a network computing device a misbehavior report policy comprising parameters usable by the processor to determine whether to send a misbehavior report; and
assigning the priority or the transmission probability to the generated misbehavior report based on the parameters of the misbehavior report policy.

10. The method of claim 9, wherein the misbehavior report policy parameters include a time window, and
wherein assigning a priority or a transmission probability to the generated misbehavior report based on the parameters of the misbehavior report policy comprises taking an action to increase the probability that the processor will send the misbehavior report in response to determining that the misbehavior report was generated during the time window.

11. The method of claim 9, wherein the misbehavior report policy parameters include an indication to increase the probability of the processor sending the misbehavior report, and
wherein assigning a priority or a transmission probability to the generated misbehavior report based on the parameters of the misbehavior report policy comprises taking an action to adjust the probability that the processor will send the misbehavior report in response to the indication in the misbehavior report policy parameters.

12. The method of claim 9, wherein the misbehavior report policy parameters include a threshold number of misbehavior reports related to a same V2X sender, and
wherein assigning a priority or a transmission probability to the generated misbehavior report based on the parameters of the misbehavior report policy comprises sending the misbehavior report in response to determining that a number of V2X reports generated by the processor that are related to the same V2X sender meets the threshold included in the misbehavior report policy parameters.

13. A vehicle-to-everything (V2X) system for use in a vehicle, comprising:
a processor configured with processor-executable instructions to:
  detect a V2X misbehavior based on detecting inaccurate or intentionally false information in a V2X message;
  generate a misbehavior report based on the detected V2X misbehavior;
  assign a priority or a transmission probability to the generated misbehavior report based on an external condition related to the detected V2X misbehavior; and
  transmit the misbehavior report based on the assigned priority or transmission probability.

14. The V2X system of claim 13, wherein the processor is further configured with processor-executable instructions to assign a priority or a transmission probability to the generated misbehavior report based on an external condition related to the detected V2X misbehavior by:
- determining for the misbehavior report an event type of the detected V2X misbehavior and determining a context of the detected V2X misbehavior based on an anticipated response to the detected V2X misbehavior; and
- assigning to the misbehavior report a criticality value based on the determined event type and the context of the detected V2X misbehavior, wherein the processor is further configured with processor-executable instructions to transmit the misbehavior report based on the assigned priority by transmitting the misbehavior report based on the assigned criticality value.

15. The V2X system of claim 14, wherein the processor is further configured with processor-executable instructions to determine the context of the detected V2X misbehavior based on an anticipated response to the detected V2X misbehavior by determining the context based on a degree to which the anticipated response by the vehicle to the detected V2X misbehavior will deviate from a current behavior of the vehicle.

16. The V2X system of claim 14, wherein the processor is further configured with processor-executable instructions to determine the context of the detected V2X misbehavior based on an anticipated response to the detected V2X misbehavior by determining an anticipated response to the detected V2X misbehavior by one or more proximate vehicles.

17. The V2X system of claim 14, wherein the processor is further configured with processor-executable instructions to determine the context of the detected V2X misbehavior based on an anticipated response to the detected V2X misbehavior by determining a degree to which the detected V2X misbehavior deviates from a ground truth determined by a processor of the V2X system.

18. The V2X system of claim 14, wherein the processor is further configured with processor-executable instructions to transmit the misbehavior report based on the assigned criticality value by using the assigned criticality value as a weight factor together with other factors used in determining whether to transmit the misbehavior report.

19. The V2X system of claim 13, wherein the processor is further configured with processor-executable instructions to:
- assign a priority or a transmission probability to the generated misbehavior report based on an external condition related to the detected V2X misbehavior by:
  - determining a number of V2X-enabled neighbor vehicles;
  - determining a weighting factor based on the number of V2X-enabled neighbor vehicles; and
  - using the weighting factor to adjust the transmission probability; and
- transmit the misbehavior report based on the assigned priority or transmission probability by transmitting the misbehavior report based on the adjusted transmission probability.

20. The V2X system of claim 19, the processor is further configured with processor-executable instructions to:
- determine whether a number of neighbor vehicles proximate to the vehicle exceeds a threshold number of vehicles;
- determine distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles;
- determine a number of vehicles that are closest to the location associated with the detected V2X misbehavior;
- take an action to increase the probability that the processor will send the misbehavior report in response to determining that the vehicle is among the number of vehicles that are closest to the location associated with the detected V2X misbehavior; and
- take an action to decrease the probability that the processor will send the misbehavior report in response to determining that the vehicle is not among the number of vehicles that are closest to the location associated with the detected V2X misbehavior.

21. The V2X system of claim 13, wherein the processor is further configured with processor-executable instructions to assign a priority or a transmission probability to the generated misbehavior report based on an external condition related to the detected V2X misbehavior by:
- receiving from a network computing device a misbehavior report policy comprising parameters usable by the processor to determine whether to send a misbehavior report; and
- assigning the priority or the transmission probability to the generated misbehavior report based on the parameters of the misbehavior report policy.

22. The V2X system of claim 21, wherein the misbehavior report policy parameters include a time window, and
wherein the processor is further configured with processor-executable instructions to assign a priority or a transmission probability to the generated misbehavior report based on the parameters of the misbehavior report policy by taking an action to increase the probability that the processor will send the misbehavior report in response to determining that the misbehavior report was generated during the time window.

23. The V2X system of claim 21, wherein the misbehavior report policy parameters include an indication to increase the probability of the processor sending the misbehavior report, and
wherein the processor is further configured with processor-executable instructions to assign a priority or a transmission probability to the generated misbehavior report based on the parameters of the misbehavior report policy by taking an action to adjust the probability that the processor will send the misbehavior report in response to the indication in the misbehavior report policy parameters.

24. The V2X system of claim 21, wherein the misbehavior report policy parameters include a threshold number of misbehavior reports related to a same V2X sender, and
wherein the processor is further configured with processor-executable instructions to assign a priority or a transmission probability to the generated misbehavior report based on the parameters of the misbehavior report policy by sending the misbehavior report in response to determining that a number of V2X reports generated by the processor that are related to the same V2X sender meets the threshold included in the misbehavior report policy parameters.

25. A vehicle-to-everything (V2X) system for use in a vehicle, comprising:

means for detecting a V2X misbehavior based on detecting inaccurate or intentionally false information in a V2X message;

means for generating a misbehavior report based on the detected V2X misbehavior;

means for assigning a priority or a transmission probability to the generated misbehavior report based on an external condition related to the detected V2X misbehavior; and means for transmitting the misbehavior report based on the assigned priority or transmission probability.

26. The V2X system of claim 25, wherein means for assigning a priority or a transmission probability to the generated misbehavior report based on an external condition related to the detected V2X misbehavior comprises:

means for determining for the misbehavior report an event type of the detected V2X misbehavior and determining a context of the detected V2X misbehavior based on an anticipated response to the detected V2X misbehavior; and means for assigning to the misbehavior report a criticality value based on the determined event type and the context of the detected V2X misbehavior, wherein means for transmitting the misbehavior report based on the assigned priority comprises means for transmitting the misbehavior report based on the assigned criticality value.

27. The V2X system of claim 25, wherein:

means for assigning a priority or a transmission probability to the generated misbehavior report based on an external condition related to the detected V2X misbehavior comprises:

means for determining a number of V2X-enabled neighbor vehicles;

means for determining a weighting factor based on the number of V2X-enabled neighbor vehicles; and means for using the weighting factor to adjust the transmission probability; and means for transmitting the misbehavior report based on the assigned priority or transmission probability comprises means for transmitting the misbehavior report based on the adjusted transmission probability.

28. The V2X system of claim 27, further comprising:

means for determining whether a number of neighbor vehicles proximate to the vehicle exceeds a threshold number of vehicles;

means for determining distances between a location associated with the detected V2X misbehavior and locations of each of the neighbor vehicles and between the location associated with the detected V2X misbehavior and the vehicle in response to determining that the number of neighbor vehicles proximate to the vehicle exceeds the threshold number of vehicles;

means for determining a number of vehicles that are closest to the location associated with the detected V2X misbehavior;

means for taking an action to increase the probability that the V2X system will send the misbehavior report in response to determining that the vehicle is among the number of vehicles that are closest to the location associated with the detected V2X misbehavior; and means for taking an action to decrease the probability that the V2X system will send the misbehavior report in response to determining that the vehicle is not among the number of vehicles that are closest to the location associated with the detected V2X misbehavior.

29. The V2X system of claim 25, wherein means for assigning a priority or a transmission probability to the generated misbehavior report based on an external condition related to the detected V2X misbehavior comprises:

means for receiving from a network computing device a misbehavior report policy comprising parameters usable by the V2X system to determine whether to send a misbehavior report; and means for assigning the priority or the transmission probability to the generated misbehavior report based on the parameters of the misbehavior report policy.

30. A non-transitory processor-readable media having stored thereon processor-executable instructions configured to cause a processor of a vehicle-to-everything (V2X) system to perform operations comprising:

detecting a V2X misbehavior based on detecting inaccurate or intentionally false information in a V2X message;

generating a misbehavior report based on the detected V2X misbehavior;

assigning a priority or a transmission probability to the generated misbehavior report based on an external condition related to the detected V2X misbehavior; and transmitting the misbehavior report based on the assigned priority or transmission probability.

* * * * *